US011689475B2

(12) United States Patent
Goyal

(10) Patent No.: US 11,689,475 B2
(45) Date of Patent: Jun. 27, 2023

(54) SYSTEM AND METHOD FOR TAG BASED RESOURCE LIMITS OR QUOTAS IN A CLOUD INFRASTRUCTURE ENVIRONMENT

(71) Applicant: ORACLE INTERNATIONAL CORPORATION, Redwood Shores, CA (US)

(72) Inventor: Alok Goyal, Seattle, WA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 153 days.

(21) Appl. No.: 16/986,158

(22) Filed: Aug. 5, 2020

(65) Prior Publication Data

US 2021/0044542 A1    Feb. 11, 2021

Related U.S. Application Data

(60) Provisional application No. 62/884,931, filed on Aug. 9, 2019, provisional application No. 62/884,933, filed on Aug. 9, 2019.

(51) Int. Cl.
*G06F 15/16* (2006.01)
*H04L 47/70* (2022.01)
(Continued)

(52) U.S. Cl.
CPC ........ *H04L 47/821* (2013.01); *G06F 9/45541* (2013.01); *G06F 9/5027* (2013.01);
(Continued)

(58) Field of Classification Search
CPC ....... H04L 47/782; H04L 63/08; H04L 51/02; G06F 2221/2141
See application file for complete search history.

(56) References Cited

U.S. PATENT DOCUMENTS 8,046,378 B1 * 10/2011 Zhuge ................... G06F 16/122
707/823
8,429,630 B2    4/2013 Nickolov
(Continued)

OTHER PUBLICATIONS

European Patent Office, International Searching Authority, International Search Report and Written Opinion Dated for International Application No. PCT/US20/45514, dated Nov. 20, 2021, 16 pages.
(Continued)

*Primary Examiner* — Hieu T Hoang
(74) *Attorney, Agent, or Firm* — Tucker Ellis LLP

(57) ABSTRACT

Systems and methods described herein support tag based resource limits or quotas in a cloud infrastructure environment. Cloud administrators do not generally have the ability to restrict resource usage in existing clouds. Granting a user permission to create resources allows them to create any number of resources up to a predefined account limit. Tags are associated with resources for allowing administrators to restrict a user's resource usage to the appropriate level by allowing fine-tuned cost control. A usage of resources in a tenancy associated with a resource tag corresponding to a request characteristic of a request to provision a resource is determined and compared against a plurality of tag-based quotas, wherein the request to provision the resource is dropped based on the determined usage exceeding one of the plurality of tag-based quotas.

20 Claims, 12 Drawing Sheets

(51) Int. Cl.
  *G06F 21/62* (2013.01)
  *G06F 21/31* (2013.01)
  *G06F 9/50* (2006.01)
  *G06F 9/455* (2018.01)
  *H04L 47/78* (2022.01)

(52) U.S. Cl.
  CPC ............ *G06F 9/5072* (2013.01); *G06F 21/31* (2013.01); *G06F 21/6218* (2013.01); *H04L 47/782* (2013.01); *H04L 47/82* (2013.01); *G06F 2221/2113* (2013.01); *G06F 2221/2141* (2013.01)

(56) References Cited

U.S. PATENT DOCUMENTS

| | | | |
|---|---|---|---|
| 8,612,395 B2* | 12/2013 | Saika | G06F 3/0647 707/665 |
| 8,938,775 B1 | 1/2015 | Roth | |
| 9,058,198 B2 | 6/2015 | McGrath | |
| 9,112,777 B1 | 8/2015 | Barclay et al. | |
| 9,268,584 B2 | 2/2016 | Atchison et al. | |
| 9,519,595 B1* | 12/2016 | Zeldin | G06F 3/0605 |
| 9,531,607 B1* | 12/2016 | Pai | H04L 43/06 |
| 9,819,626 B1* | 11/2017 | Berg | H04L 41/5006 |
| 10,089,476 B1* | 10/2018 | Roth | H04L 63/10 |
| 10,089,676 B1* | 10/2018 | Gupta | G06Q 30/0633 |
| 10,110,506 B2 | 10/2018 | Kasso et al. | |
| 10,225,158 B1* | 3/2019 | Lu | G06F 16/113 |
| 10,242,370 B2 | 3/2019 | Meek | |
| 10,454,788 B2 | 10/2019 | Mordani | |
| 10,516,667 B1 | 12/2019 | Roth | |
| 10,789,098 B1* | 9/2020 | Lin | G06F 9/5011 |
| 10,977,377 B2 | 4/2021 | Roth | |
| 11,003,497 B2 | 5/2021 | Xiao | |
| 11,146,502 B2 | 10/2021 | Sun | |
| 11,252,190 B1* | 2/2022 | Sharifi Mehr | H04L 63/10 |
| 2004/0261081 A1* | 12/2004 | Sen | G06F 11/3466 719/313 |
| 2006/0117135 A1* | 6/2006 | Thind | G06F 3/0605 711/112 |
| 2009/0157645 A1* | 6/2009 | Green | G06F 16/48 707/999.005 |
| 2009/0288084 A1* | 11/2009 | Astete | G06Q 30/0603 718/1 |
| 2010/0077449 A1* | 3/2010 | Kwok | G06F 9/5027 718/104 |
| 2012/0066179 A1* | 3/2012 | Saika | G06F 3/067 707/634 |
| 2012/0331539 A1* | 12/2012 | Matsugashita | G06F 21/6218 726/9 |
| 2013/0074091 A1* | 3/2013 | Xavier | H04L 67/10 718/104 |
| 2013/0103641 A1* | 4/2013 | Rehman | G06F 11/3003 707/769 |
| 2014/0189682 A1* | 7/2014 | Crudele | G06F 3/0665 718/1 |
| 2014/0280040 A1* | 9/2014 | Moxley | G06F 16/248 707/722 |
| 2014/0282520 A1 | 9/2014 | Sabharwal | |
| 2014/0282889 A1* | 9/2014 | Ishaya | H04L 63/101 726/4 |
| 2014/0359113 A1 | 12/2014 | Krebs | |
| 2015/0039357 A1* | 2/2015 | Segal | G06Q 10/06314 705/5 |
| 2015/0082301 A1 | 3/2015 | Garg | |
| 2015/0089065 A1* | 3/2015 | Kasso | H04L 47/741 709/226 |
| 2015/0120938 A1* | 4/2015 | Mordani | H04L 41/5054 709/226 |
| 2015/0188840 A1 | 7/2015 | Xiao | |
| 2015/0286505 A1* | 10/2015 | Liu | G06F 9/5011 718/104 |
| 2015/0370608 A1* | 12/2015 | Dipol | H04L 67/1025 718/104 |
| 2016/0132805 A1* | 5/2016 | Delacourt | G06Q 10/00 705/7.23 |
| 2016/0132808 A1* | 5/2016 | To | G06Q 10/06315 705/7.25 |
| 2016/0142323 A1 | 5/2016 | Lehmann | |
| 2016/0197880 A1 | 7/2016 | Korman et al. | |
| 2016/0205110 A1 | 7/2016 | Roth | |
| 2016/0239391 A1* | 8/2016 | Sagiyama | G06F 11/20 |
| 2016/0328259 A1* | 11/2016 | Xia | H04L 41/28 |
| 2017/0070445 A1* | 3/2017 | Zhang | H04L 41/0896 |
| 2017/0097851 A1* | 4/2017 | Chen | G06F 9/45558 |
| 2017/0286916 A1 | 10/2017 | Skiba | |
| 2018/0145923 A1 | 5/2018 | Chen | |
| 2019/0028456 A1* | 1/2019 | Kurian | H04L 63/10 |
| 2019/0034642 A1 | 1/2019 | Roth | |
| 2019/0146848 A1* | 5/2019 | Rastogi | G06F 9/5016 718/104 |
| 2019/0207945 A1 | 7/2019 | Yuan et al. | |
| 2020/0007455 A1* | 1/2020 | Chhabra | H04L 47/70 |
| 2020/0034177 A1 | 1/2020 | Geldart | |
| 2020/0034206 A1* | 1/2020 | Dimitrov | G06F 9/5077 |
| 2020/0044983 A1* | 2/2020 | Zheng | H04L 47/801 |
| 2020/0159676 A1 | 5/2020 | Durham | |
| 2020/0294152 A1 | 9/2020 | Fletcher | |
| 2021/0081409 A1 | 3/2021 | Rath | |
| 2021/0176122 A1 | 6/2021 | Bregman | |
| 2021/0303328 A1 | 9/2021 | Soppin | |
| 2021/0357263 A1 | 11/2021 | Cruanes | |
| 2021/0377814 A1 | 12/2021 | Sillanpaa | |

OTHER PUBLICATIONS

Amazon Web Services, AWS General Reference , "AWS service quotas", 1 pages, © 2021, Amazon Web Services, Inc., retrieved from: <https://docs.aws.amazon.com/general/latest/gr/rande-manage.html>.

Amazon Web Services, AWS General Reference , "Tagging AWS resources", 4 pages , © 2021, Amazon Web Services, Inc., retrieved from: <https://docs.aws.amazon.com/general/latest/gr/aws_service_limits.html>.

Amazon Web Services, AWS General Reference , "Managing AWS Regions", 2 pages , © 2021, Amazon Web Services, Inc., retrieved from: <https://docs.aws.amazon.com/general/latest/gr/aws_tagging.html>.

Microsoft, "Azure Arc documentation", © Microsoft 2021, 23 pages, retrieved from: <https://docs.microsoft.com/en-us/azure/azure-arc/>.

CloudDaddy, "Stress-Free AWS Infrastructure Management", 9 pages, Copyright © 2021 Cloud Daddy, Inc. , retrieved from: <https://www.clouddaddy.com/our-solutions/infrastructure-management>.

OpenStack, "Nested quotas", Updated: Aug. 23, 2019 18:51 , 4 pages, retrieved from: <https://docs.openstack.org/ocata/config-reference/block-storage/nested-quota.html>.

Raghuram, Sirish "Multi-Region Management (and Multi-Hypervisor Too)", published on Feb. 10, 2016, last updated Jun. 9, 2021, © 2021 Platform9, 12 pages.

Apache CloudStack, Apache CloudStack developers guide, "Quota Plugin", © Copyright 2016, Apache Software Foundation, 4 pages.

United States Patent and Trademark Office, Office Communication dated Oct. 28, 2021 for U.S. Appl. No. 16/986,163, 12 pages.

United States Patent and Trademark Office, Notice of Allowance and Fee(s) due dated Apr. 29, 2022 for U.S. Appl. No. 16/986,162, 15 pages.

United States Patent and Trademark Office, Notice of Allowance and Fee(s) due dated Sep. 22, 2022 for U.S. Appl. No. 16/986,160, 20 pages.

* cited by examiner

SYSTEM AND METHOD FOR TAG BASED RESOURCE LIMITS OR QUOTAS IN A CLOUD INFRASTRUCTURE ENVIRONMENT

CLAIM OF PRIORITY AND CROSS REFERENCE TO RELATED APPLICATIONS

This application claims the benefit of priority to U.S. Provisional Patent Application titled "SYSTEM AND METHOD FOR TAG BASED RESOURCE LIMITS OR QUOTAS IN A CLOUD INFRASTRUCTURE ENVIRONMENT", Application No. 62/884,931, filed Aug. 9, 2019; and U.S. Provisional Patent Application titled "SYSTEM AND METHOD FOR TAG BASED REQUEST CONTEXT IN A CLOUD INFRASTRUCTURE ENVIRONMENT", Application No. 62/884,933, filed Aug. 9, 2019; and is related to U.S. Patent Application titled "SYSTEM AND METHOD FOR TAG BASED REQUEST CONTEXT IN A CLOUD INFRASTRUCTURE ENVIRONMENT", Application No. 16/986,160, filed Aug. 5, 2020; each of which applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments described herein are generally related to cloud infrastructure environments, such as Infrastructure as a Service (IaaS), and are particularly related to systems and methods for providing systems and methods for providing resource constraints within such cloud infrastructure environments.

BACKGROUND

Cloud infrastructure environments can comprise sets of complementary cloud services that enable users and clients (throughout the specification, the terms "clients" and "customers" can be used interchangeably) to build and run a wide range of applications and services in a highly available hosted environment.

Year to year, more and more businesses and organizations are migrating mission critical applications and systems to a cloud infrastructure environment. There are various reasons for this shift. For example, many businesses are moving to the cloud in order to reduce the cost and complexity of operating, maintaining, and building out on-premise infrastructure. As well, cloud infrastructure also allows for a more rapid information technology (IT) delivery mechanism. Some businesses and organizations additionally see the cloud infrastructure environment as a means to gain a leg up on competition by adapting to a nimbler system.

Within IaaS (Infrastructure as a Service) models, a cloud provider can provide, host, and manage infrastructure components that would, in traditional settings, be on-premise at each customer's/client's location. Such components traditionally provided on-premise can include hardware, for example, data warehouses and data centers, servers, storage, networking hardware, as well as software, such as virtualization software.

IaaS providers can, in addition to providing hardware and software that would traditionally be on-premise, also provide services to their clients and customers. As an example, clients and customers can be allowed to tailor their IaaS subscription to fit their needs, which then in turn allows for detailed and broken-down billing and invoicing. IaaS can also support features such as load balancing, redundancy, replication and recovery. Because such services are offered and supported by the IaaS provider (and not the customer), this leaves clients and customers to be more focused on improving their business by pushing more into automation and orchestration for their services.

Cloud infrastructures enable users and clients to seamlessly run traditional enterprise applications along with cloud-native apps, all on the same platform, reducing operational overhead and enabling direct connectivity between both types of workloads.

SUMMARY

Described herein are systems and methods for providing tag based resource limits or quotas in a cloud infrastructure environment. Systems and methods described herein support tag based resource limits/quotas in a cloud infrastructure environment. A fine grained approach can provide resource limits based on tags spanning multiple containers. Tags are a mechanism which are mainly used in the resource governance, and cloud providers also use them for cost governance. Systems and methods can create a mechanism to control costs at a group level through tags. Systems and methods provide compartment quotas for a cloud infrastructure environment.

Cloud administrators have the ability to restrict resource usage in existing clouds, but only at a high level and without a view of particular users, particular resources and resource types, or of resources at levels of container hierarchical structures. In accordance with an embodiment resources are associated with tags so that their usage can be controlled, tracked and/or otherwise handled at the resource level as may be necessary or desirable. Providing resource quotas and/or limits allows administrators and others to restrict a user's resource usage to the appropriate level allowing fine-tuned cost control.

In accordance with an embodiment, customers can be assigned service level limits defined by the cloud infrastructure environment at account creation time. These service level limits restrict the total number of resources a customer can create across the entire tenancy (e.g., across multiple regions with multiple compartments, and spanning multiple containers). Tenancy and compartment administrators can utilize tag based resource quotas to set resource-specific limits. Without such limits based on tags that are associated with the resources, a user that is authorized to launch instances can consume all available capacity in the entire tenancy. Tag based resource limits solve this problem and, unlike service limits, are set and customized by the clients and customers via, e.g., a console, SDK, or API. Tag based resource limits can be applied on top of the service limits and inherited through the nested compartment hierarchy. This allows compartment administrators to limit resource consumption and set boundaries around acceptable resource use.

DETAILED DESCRIPTION

As described above, cloud infrastructure environments can comprise sets of complementary cloud services that enable users and clients to build and run a wide range of applications and services in a highly available hosted environment.

Figure 1:
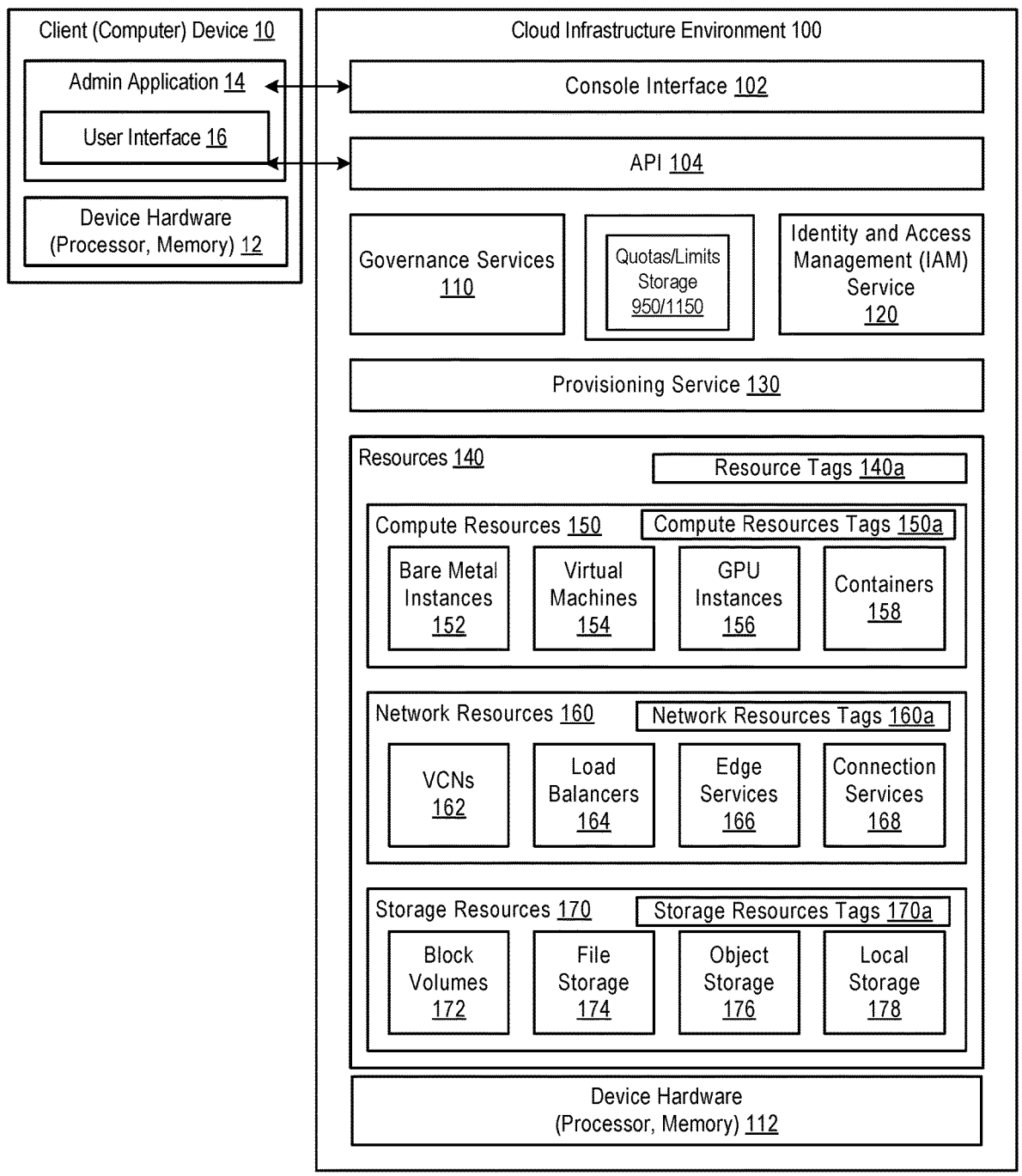
FIG. 1 illustrates a system for providing a cloud infrastructure environment, in accordance with an embodiment.

FIG. 1 shows a system for providing a cloud infrastructure environment, in accordance with an embodiment.

In accordance with an embodiment, a cloud infrastructure environment 100, which can be run on a number of hardware and software resources 112, can comprise a console interface 102 and an API 104. In addition, the cloud infrastructure environment 100 can support a number of governance services 110, an identity and access management (IAM) service 120, and a provisioning service 130. The cloud infrastructure environment 100 can also support a number of resources 140, e.g., in layers, such as a computer resource layer 150, a network resource layer 160, and a storage resource layer 170. The cloud infrastructure environment 100 can also support a number of tags associated with each of the resources including for example resource tags 140a associated with the resources 140 in general, computer resource tags 150a associated with the computer resources 150, network resource tags 160a associated with the network resources 160, and storage resource tags 170a associated with the storage resources 170.

In accordance with an embodiment, a client device, such as a computing device 10 having device hardware (processor, memory . . . etc.) 12, can communicate with the cloud infrastructure environment via a network, such as a wide area network (WAN), a local area network (LAN), or the internet, for example. The client device can comprise an administrator application 14, which can comprise a user interface 16.

In accordance with an embodiment, within the cloud infrastructure environment, tenancy can be supported. On registration and deployment, a tenancy can be created for each client/customer, which can comprise a secure and isolated partition within the cloud infrastructure in which the client can create, organize, and administer their cloud resources.

In accordance with an embodiment, the console interface 102 and the API 104 can provide clients with access to, and control over respective portions of the could infrastructure environment. In accordance with an embodiment, the console interface can comprise an intuitive, graphical interface that lets clients create and manage resources, instances, cloud networks, and storage volumes, as well as manage users associated with the client, and set permissions within the client scope. As well, the API 104 can compromise, for example, a REST API that utilizes HTTPS (hypertext transfer protocol secure).

In accordance with an embodiment, one example of a console interface or API can be a configuration management tool (e.g., Ansible). The configuration management tool can be used for cloud infrastructure provisioning, orchestration, and configuration management. Configuration management tools can allow clients to automate configuring and provisioning of the cloud infrastructure, deploying and updating software assets, and orchestrating complex operational processes.

In accordance with an embodiment, the governance services 110 of the cloud infrastructure environment provides clients tools to help clients enable simple resource governance, manage costs, and control access to the cloud infrastructure. As an example, the governance services provide for tagging which can allow for clients to apply tags to their resources for informational or operational reasons. Defined tags can be controlled to avoid incorrect tags from being applied to resources. Tags can also provide a flexible targeting mechanism for administrative scripts. As well, the governance services can allow for managed budgets, and track actual and forecasted spend all from one place. This allows clients to stay on top of usage with a cost analysis dashboard, and filter by compartments and tags to analyze spending by departments, teams, and projects. Such data can as well be exported for detailed resource utilization reporting and integration with an existing cloud management and business intelligence tools. The governance services can also log events that can later be retrieved, stored, and analyzed for security, compliance, and resource optimization across the cloud infrastructure entitlements and compartments.

In accordance with an example embodiment, the governance services provide for tagging allowing the clients, administrators and the like to apply tags to their resources for informational or operational reasons as the resources are being instantiated. In accordance with a further example embodiment, the governance services also provide the tagging allowing the clients and others to apply tags to their resources for informational or operational reasons after the resources have been instantiated, thereby allowing for retroactive enforcement of resource quotas or limits in systems using the tags.

In accordance with an embodiment, the identity and access management (IAM) service 120 can create a user profile for each client/customer/user in the IAM service with associated with user credential (e.g., username and password). Clients can be granted administrator privileges in the cloud infrastructure as well via the IAM service.

In accordance with an embodiment, the identity and access management service can be integrated with the cloud infrastructure environment. Upon a client registering. The IAM service can create a separate user credential in an identity service, which can then allow for single sign on to the cloud infrastructure service as well as access to additional cloud services.

In accordance with an embodiment, the provisioning service 130 can provision, for example, a tenancy within cloud infrastructure service, such as within the resources 140. The provisioning service can be accessed and controlled through, for example, the console interface or via one or more APIs, such as API 104. The provisioning service can allow for clients to provision and manage compute hosts, which can be referred to as instances. Clients can launch instances as needed to meet compute and application requirements. After a client launches an instance, the provisioned instance can be accessed from, for example, a client device. The provisioning service can also provide for restarting an instance, attaching and detaching volumes from an instance, and terminating an instance.

In accordance with an embodiment, resources 140 provided by an cloud infrastructure environment can be broken down into a plurality of layers, such as a compute resources layer 150, a network resources layer 160, and a storage resource layer 170.

In accordance with an embodiment, the compute resources layer 150 can comprise a number of resources, such as, for example, bare metal instances 152, virtual machines 154, edge services 156, and containers 158. The compute resources layer can be used to, for example, provision and manage bare metal compute instances, provision instances as needed to deploy and run applications, just as in an on-premises data center. The cloud infrastructure environment 100 in accordance with the example embodiment supports a number of tags 140*a* associated with each of the resources including for example computer resource tags 150*a* associated with the computer resources 150 including for example, the bare metal instances 152, the virtual machines 154, the edge services 156, and the containers 158.

In accordance with an embodiment, the cloud infrastructure environment can provide control of one or more physical host ("bare metal") machines within the compute resources layer. Bare metal compute instances run directly on bare metal servers without a hypervisor. When a bare metal compute instance is provisioned, the client can maintain sole control of the physical CPU, memory, and network interface card (NIC). The bare metal compute instance can be configured and utilize the full capabilities of each physical machine as if it were hardware running in an on-premise own data center. As such, bare metal compute instances are generally not shared between tenants.

In accordance with an embodiment, bare metal compute instances can provide, via the associated physical hardware as opposed to a software-based virtual environment, a high level of security and performance.

In accordance with an embodiment, the cloud infrastructure environment can provide control of a number of virtual machines within the compute resources layer. A virtual machine compute host can be launched, for example, from an image that can determine the virtual machines operation system as well as other software. The types and quantities of resources available to a virtual machine instance can be determined, for example, based upon the image that the virtual machine was launched from.

In accordance with an embodiment, a virtual machine (VM) compute instance can comprise an independent computing environment that runs on top of physical bare metal hardware. The virtualization makes it possible to run multiple VMs that are isolated from each other. VMs can be used, for example, for running applications that do not require the performance and resources (CPU, memory, network bandwidth, storage) of an entire physical machine.

In some embodiments, virtual machine instances can run on the same hardware as a bare metal instance, which can provide leverage over using the same cloud-optimized hardware, firmware, software stack, and networking infrastructure.

In accordance with an embodiment, the cloud infrastructure environment can provide a number of graphical processing unit (GPU) compute instances within the compute resources layer. Accelerated computing requires consistently-fast infrastructure across every service. With GPU instances, clients can process and analyze massive data sets more efficiently, making them useful for complex machine learning (ML), artificial intelligence (AI) algorithms, and many industrial HPC applications. GPU compute instances can be provisioned as either virtualized compute instances (where multiple GPU compute instances share the same bare metal hardware), or as bare metal instances which provide dedicate hardware for each GPU compute instance.

In accordance with an embodiment, the cloud infrastructure environment can provide a number of containerized compute instances within the compute resources layer. A standalone container engine service can be used to build and launch containerized applications to the cloud. The container service can be used, for example, to build, deploy, and manage cloud-native applications. The container service can specify the compute resources that the containerized applications require, and the container engine can then provision, via the provisioning service, the required compute resources for use within the cloud infrastructure environment (e.g., in the context of a tenancy).

In accordance with an embodiment, one such container service engine that can be used is Kubernetes, an open-source system for automating deployment, scaling, and management of containerized applications across clusters of hosts. Such container services can group the containers that make up an application into logical units for easy management and discovery.

In accordance with an embodiment, the network resources layer 160 can comprise a number of resources, such as, for example, virtual cloud networks (VCNs) 162, load balancers 164, edge services 166, and connection services 168. The cloud infrastructure environment 100 in accordance with the example embodiment supports a number of tags associated with each of the resources including for example resource tags 140*a* associated with the resources 140 in general, and network resource tags 160*a* associated with the virtual cloud networks (VCNs) 162, the load balancers 164, the edge services 166, and the connection services 168.

In accordance with an embodiment, the cloud infrastructure environment can provide a number of virtual cloud networks 162 at the networking resources layer. A virtual cloud network can comprise a virtual version of a traditional network including subnets, route tables, and gateways on which client instances can run. A cloud network resides within a single region but includes all the region's availability domains. Each subnet defined in the cloud network can either be in a single availability domain or span all the availability domains in the region (recommended). At least one cloud network can be configured before launching instances. In certain embodiments, VCNs can be configured via an internet gateway to handle public traffic, a VPN connection, or a fast connect service to securely extend on-premises network.

In accordance with an embodiment, the cloud infrastructure environment can provide a number of load balancers 164 at the networking resources layer. A load balancing service can provide automated traffic distribution from one entry point to multiple servers reachable from a virtual cloud network (VCN). Various load balances can provide a public or private IP address, and provisioned bandwidth.

In accordance with an embodiment, a load balancer can improved resource utilization, scaling, and help ensure high availability. Multiple load balancing policies can be configured, and application-specific health checks can be provided to ensure that the load balancer directs traffic only to healthy instances. The load balancer can reduce maintenance window by draining traffic from an unhealthy application server before it is removed from service for maintenance.

In accordance with an embodiment, a load balancing service enables creation of a public or private load balancer in conjunction with a VCN. A public load balancer has a public IP address that is accessible from the internet. A private load balancer has an IP address from the hosting subnet, which is visible only within the VCN. Multiple listeners can be configured for an IP address to load balance transport different layers of traffic (e.g., Layer 4 and Layer 7 (TCP and HTTP) traffic). Both public and private load balancers can route data traffic to any backend server that is reachable from the VCN.

In accordance with an embodiment, a public load balancer can accept traffic from the internet, a public load balance can be created that is assigned a public address, which serves as the entry point for incoming traffic.

In accordance with an embodiment, a public load balancer is regional in scope. If a region includes multiple availability domains, a public load balancer can have, for example, a regional subnet, or two availability domain-specific (AD-specific) subnets, each in a separate availability domain. With a regional subnet, the load balancer can creates a primary load balancer and a standby load balancer, each in a different availability domain, to ensure accessibility even during an availability domain outage. If a load balance is created in multiple AD-specific subnets, one subnet can host the primary load balancer and the other hosts a standby load balancer. If the primary load balancer fails, the public IP address can switch to the secondary load balancer. The service treats the two load balancers as equivalent.

In accordance with an embodiment, if a region includes only one availability domain, the service requires just one subnet, either regional or AD-specific, to host both the primary and standby load balancers. The primary and standby load balancers can each have a private IP address from the host subnet, in addition to the assigned floating public IP address. If there is an availability domain outage, the load balancer has no failover.

In accordance with an embodiment, private load balances can also be provided so as to isolate the load balancer from the internet and simplify security posture. The load balancer service can assign a private address to the load balancer that serves as the entry point for incoming traffic.

In accordance with an embodiment, a private load balancer can be created by a service to service only one subnet to host both the primary and standby load balancers. The load balancer can be regional or AD-specific, depending on the scope of the host subnet. The load balancer is accessible only from within the VCN that contains the host subnet, or as further restricted by security rules.

In accordance with an embodiment, the assigned floating private IP address is local to the host subnet. The primary and standby load balancers each require an extra private IP address from the host subnet.

In accordance with an embodiment, if there is an availability domain outage, a private load balancer created in a regional subnet within a multi-AD region provides failover capability. A private load balancer created in an AD-specific subnet, or in a regional subnet within a single availability domain region, has no failover capability in response to an availability domain outage.

In accordance with an embodiment, the cloud infrastructure environment can provide a number of edge services 166 at the networking resources layer. In general, edge services comprise a number of services that allow clients to manage, secure, and maintain domains and endpoints. These include, for example, DNS (domain name system), DDoS (distributed denial of service) protection, and email delivery. These services enable clients to optimize performance, thwart cyberattacks, and scale communication.

In accordance with an embodiment, the cloud infrastructure environment can provide a number of connection services 168 at the networking resources layer. Such connection services can provide an easy way to create a dedicated, private connection between a client data center or existing network and the cloud infrastructure environment. The connection service can provide high bandwidth, and a reliable and consistent network.

In accordance with an embodiment, the storage resources layer 170 can comprise a number of resources, such as, for example, block volumes 172, file storage 174, object storage 176, and local storage 178. The cloud infrastructure environment 100 in accordance with the example embodiment supports a number of tags associated with each of the resources including for example resource tags 140a associated with the resources 140 in general, and storage resource tags 170a associated with the block volumes 172, the file storage 174, the object storage 176, and the local storage 178.

In accordance with an embodiment, block volumes 172 provide high-performance network storage capacity that supports a broad range of I/O intensive workloads. Clients can use block volumes to expand the storage capacity of compute instances, to provide durable and persistent data storage that can be migrated across compute instances, and to host large databases.

In accordance with an embodiment, file storage 174 allows clients to create a scalable, distributed, enterprise-grade network file system. File storage supports semantics, snapshots capabilities, and data at-rest encryption.

In accordance with an embodiment, object storage provides high throughput storage for unstructured data. Object storage service enables near limitless storage capacity for large amounts of analytic data, or rich content like images and videos. Block volumes can be backed up to object storage for added durability.

In accordance with an embodiment, local storage 178 can provide, for example, high speed and reliable storage in the form of solid state drives for I/O intensive applications. These can be provided, for example, within bare metal instances. Local storage provides high storage performance for VM's and bare metal compute instances. Some examples include relational databases, data warehousing, big data, analytics, AI and HPC application.

Figure 2:
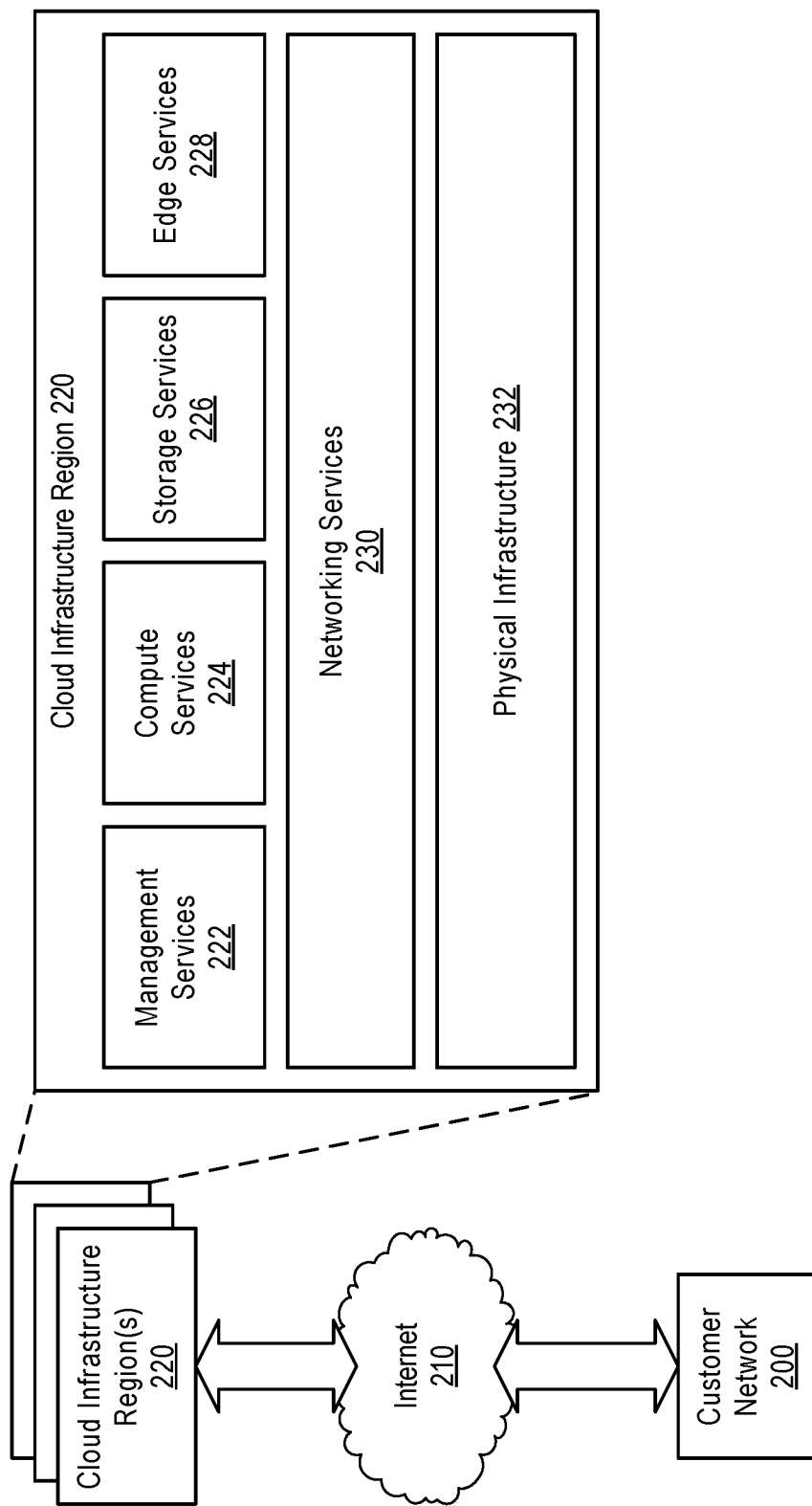
FIG. 2 illustrates a system for providing cloud infrastructure regions within a cloud infrastructure environment, in accordance with an embodiment.

FIG. 2 illustrates a system for providing cloud infrastructure regions within a cloud infrastructure environment, in accordance with an embodiment.

In accordance with an embodiment, instances of the cloud infrastructure environment described above in FIG. 1 can be hosted in different regions, called cloud infrastructure regions 220. These can be accessed, as described above, via a console, SDK, or APIs, by customer networks 200 via a network, such as the internet 210. Each cloud infrastructure region can comprise management services 222, compute services 224, storage services 226, edge serves 228, network services 230, and physical infrastructure 232.

In accordance with an embodiment, a cloud infrastructure can be hosted in regions and availability domains. A region can be a localized geographic area, and an availability domain can be one or more data centers located within a region. A region is composed of one or more availability domains. Most cloud infrastructure resources can be either region-specific, such as a virtual cloud network, or availability domain-specific, such as a compute instance. Traffic between availability domains and between regions is encrypted.

In accordance with an embodiment, availability domains are isolated from each other, fault tolerant, and very unlikely to fail simultaneously. Because availability domains do not share infrastructure such as power or cooling, or the internal availability domain network, a failure at one availability domain within a region is unlikely to impact the availability of the others within the same region.

In accordance with an embodiment, availability domains within the same region can be connected to each other by a low latency, high bandwidth network, which can provide high-availability connectivity to the internet and on-premises, and to build replicated systems in multiple availability domains for both high-availability and disaster recovery.

In accordance with an embodiment, regions are independent of other regions and can be separated geographically (e.g., across countries or continents). This then leads to the deployment of an application within a region where the application would most likely be utilized the most frequently.

In accordance with an embodiment, however, applications can also be deployed in different regions for various reasons. This can include, for example, risk mitigation when events, such as weather systems, take a region offline. In addition, applications can be deployed in other regions for strategic reasons, such as tax domains or other business or social criteria.

In accordance with an embodiment, there are several services that are available across regions. These include, for example, management services 222, compute services 224, storage services 226, edge services 228, and network services 230.

In accordance with an embodiment, compartments allow clients to organize and control access to cloud resources. A compartment is a collection of related resources (such as instances, virtual cloud networks, block volumes) that can be accessed only by certain groups that have been given permission by an administrator. For example, one compartment could contain all the servers and storage volumes that make up the production of a company's Human Resources (HR) system by way of example, and other compartments could each be separately dedicated to a company's legal, marketing, accounting, operations, and Information Technology (IT) systems by way of further example. In an example, only users with permission to that compartment can manage and/or access those servers and volumes. In a further example, the compartments could contain all the servers and storage volumes that make up the production of collections of a company's Human Resources (HR) system, and legal, marketing, accounting, operations, and Information Technology (IT) systems. In an example, only users with permission to portions of those resources can manage and/or access those portions on the servers and volumes.

The compartments of the example embodiments comprise one or more logical group and are not necessarily a physical memory container, although they could be physical memory containers if desired or necessary. When working within a console, a compartment can act as a filter for what is allowed to be viewed. Compartments are a primary building block that can be used for cloud resources, and they can be used to organize and isolate resources to make it easier to manage and secure access to those resources.

In accordance with an embodiment, compartments can have several layers. For example, a tenancy can be considered a root compartment that holds all of a client's cloud resources. Additional compartments can be created within that root compartment (tenancy) and corresponding policies can be created to control access to the resources in each compartment. When clients create a cloud resource such as compute, storage, VCN, IP Address and/or DNS instances, block volume, or cloud network, such resources can be directed to a specific compartment or compartments. Compartments can span regions.

Fault Domains

In accordance with an embodiment, a fault domain can comprise a grouping of hardware and infrastructure within an availability domain. Each availability domain can comprise three fault domains. Fault domains allow instances to be distributed so that they are not on the same physical hardware within a single availability domain. A hardware failure or Compute hardware maintenance that affects one fault domain does not affect instances in other fault domains.

In accordance with an embodiment, placement of resources, such as compute, bare metal DB system, or virtual machine DB system instances, can optionally specify a fault domain or a new instance at launch time. The resources can additionally change fault domains after placement by terminating the resource at the current fault domain and launching a new instance of the resource at another fault domain.

In accordance with an embodiment, fault domains can be utilized for a number of reasons, such as protecting against unexpected hardware failures and protecting against planned outages due to maintenance.

Availability

In accordance with an embodiment, service availability can be provided. Regions within cloud infrastructure environments can provide core infrastructure services and resources, including the following:
Compute: Compute (Bare Metal & VM, DenseIO & Standard), Container Engine for Kubernetes, Registry Storage: Block Volume, File Storage, Object Storage, Archive Storage
Networking: Virtual Cloud Network, Load Balancing, Fast-Connect
Database: Database, Exadata Cloud Service, Autonomous Data Warehouse, Autonomous Transaction Processing
Edge: DNS
Platform: Identity and Access Management, Tagging, Audit In accordance with an embodiment, the above services and resources can be generally available, while other services and resources can additionally be available as well (e.g., based upon regional demand or customer request). As an example, new cloud services can be made available in regions as quickly based on a variety of considerations including regional customer demand, ability to achieve regulatory compliance where applicable, resource availability, and other factors. Because of low latency interconnect backbone, customers can use cloud services in other geographic regions with effective results when they are not available in their home region, provided that data residency requirements do not prevent them from doing so.

In accordance with an embodiment, resource availability can be considered in the context of global availability, regional availability, single region availability, and domain availability. Generally speaking, IAM resources are globally available, DB systems, instances, and volumes are specific to a viability domain. Most other resources are regional.

In accordance with an embodiment, examples of globally available resources can include API signing keys, compartments, dynamic groups, federation resources, groups, policies, tag namespaces, tag keys, and users.

In accordance with an embodiment, examples of regionally available resources can include, alarms, applications, buckets (although buckets are regional resources, they can be accessed from any location when the correct region-specific Object Storage URL for the API calls is used), clusters, cloud events-rules, customer-premises equipment (CPE), DHCP options sets, dynamic routing gateways (DRGs), encryption keys, functions, images, internet gateways, jobs, key vaults, load balancers, local peering gateways (LPGs), metrics, NAT gateways, network security groups, node pools, ons-subscriptions, ons-topics, repositories, reserved public Ips, route tables, security lists, service gateways, stacks, subnets (when a subnet is created, it can be declared to be a regional or specific to an availability domain), virtual cloud networks (VCNs), and volume backups (volume backups can be restored as new volumes to any availability domain within the same region in which they are stored).

In accordance with an embodiment, examples of availability domain-specific resources can include DB Systems, ephemeral public Ips, instances (instances can be attached to volumes in the same availability domain), subnets (when a subnet is created, it can be declared to be a regional or specific to an availability domain), and volumes (volumes can be attached to an instance in a same availability domain).

Compartments

In accordance with an embodiment, administrators can manage compartments within a cloud infrastructure environment.

In accordance with an embodiment, tags can be applied to resources within a compartment. Tags can be used to, for example, organize resources according a schema, such as a business needs schema. Tags can be applied to resources at the time of creation of a resource, or a tag can be updated on an existing resource. The tags associated with each of the resources may include for example resource tags 140a (FIG. 1) associated with the resources 140 in general, computer resource tags 150a associated with the computer resources 150, network resource tags 160a associated with the network resources 160, and storage resource tags 170a associated with the storage resources 170.

In accordance with an embodiment, compartments are important to the construction and organization of a cloud infrastructure. Resources can be moved between compartments, and resources can be displayed (e.g., via a user interface) organized by compartment within a current region. When working with and managing resources, a compartment can first be selected.

In accordance with an embodiment, compartments are tenancy-wide, and can span across regions. When a compartment is created, the compartment can be made available within every region that a tenancy is subscribed to.

In accordance with an embodiment, compartments can be deleted. In order for a compartment to be deleted, the compartment can have all resources therein removed prior to deletion.

In accordance with an embodiment, the action to delete a compartment can be asynchronous and initiates a work request. The state of the compartment changes to "Deleting" while the work request is executing. If the work request fails, the compartment is not deleted and it returns to the active state.

In accordance with an embodiment, each compartment created within the cloud infrastructure environment can have certain properties. For example, each compartment can be assigned a unique identifier (ID), and can additionally, and optionally, be provided with a modifiable description, as well as a name. In accordance with an embodiment, sub-compartments (or subcompartments) can be defined in a hierarchical manner under a base compartment.

In accordance with an embodiment, access and control over compartments and subcompartments can be limited to administrators or other users with sufficient credentials. Credentials can be associated with differing levels of compartment access. For example, an administrator can have permission to view and access all compartments and work with resources within any compartment of a tenancy, but a user with more limited access will not have such a level of access and control.

Figure 3:
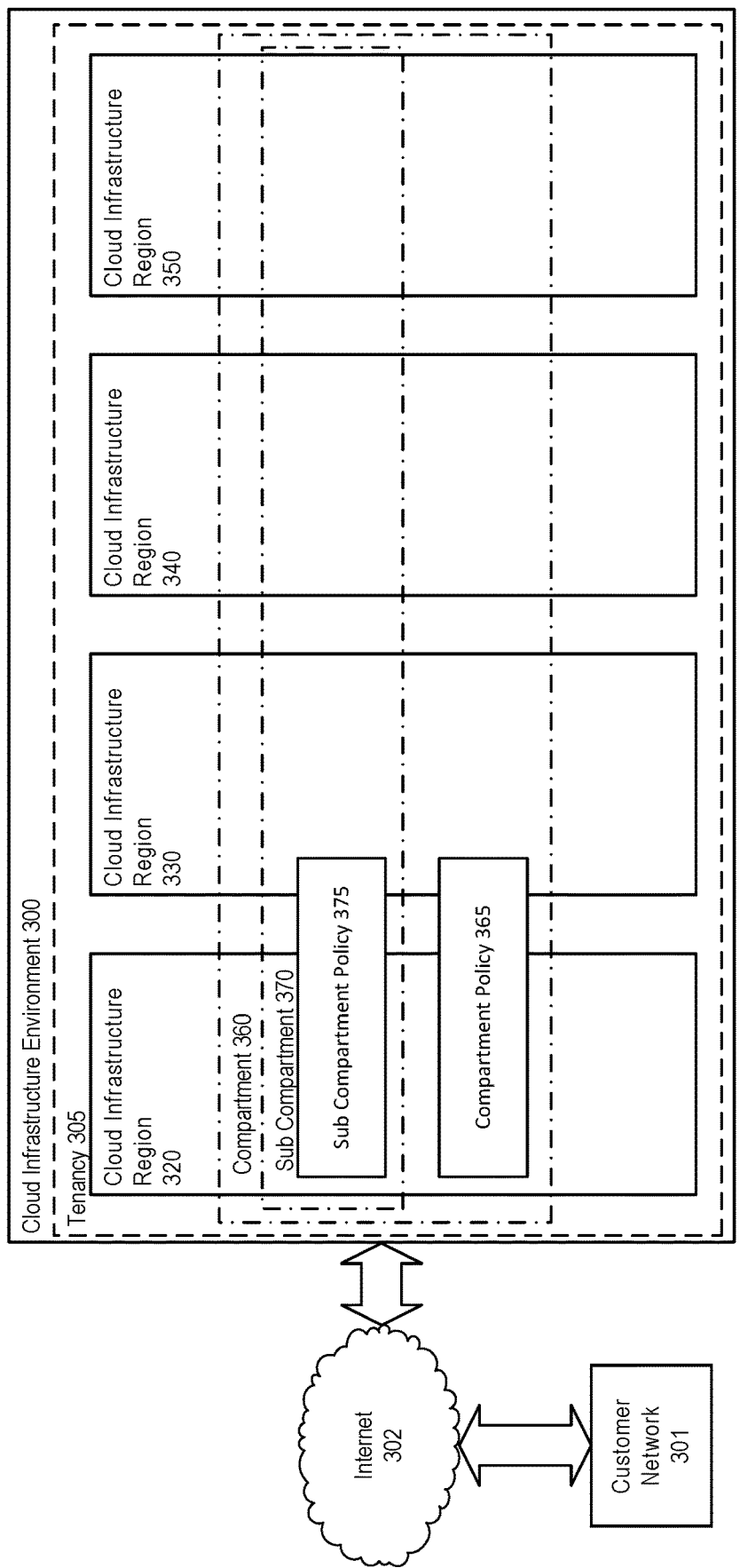
FIG. 3 shows a cloud infrastructure environment system illustrating relationships between compartments, compartment policies, sub-compartments, and sub-compartment policies for policy management and control spanning cloud infrastructure regions, in accordance with an embodiment.

FIG. 3 shows a cloud infrastructure environment 300 illustrating relationships between compartments 360, compartment policies 365, sub-compartments 370, and sub-compartment policies 375 for policy management and control spanning cloud infrastructure regions, in accordance with an embodiment.

In accordance with an embodiment, as described above, instances of the cloud infrastructure environment described above in FIG. 1 can be hosted in different regions, such as cloud infrastructure regions 320, 330, 340, 350. These can be accessed, as described above, via a console, SDK, or APIs, by customer networks 301 via a network 302, such as the internet.

In accordance with an embodiment, a customer network 301 can comprise, for example, a single computer, a network of customer computers, or other such networks.

In accordance with an embodiment, although not shown in the Figure, each cloud infrastructure region can comprise a number of services, each comprising a number of resources, such as management services, compute services, storage services, edge serves, network services, and physical infrastructure.

In accordance with an embodiment, a cloud infrastructure can be hosted in regions and availability domains. A region can be a localized geographic area, and an availability domain can be one or more data centers located within a region. A region is composed of one or more availability domains. Most cloud infrastructure resources can be either region-specific, such as a virtual cloud network, or availability domain-specific, such as a compute instance. Traffic between availability domains and between regions is encrypted.

In accordance with an embodiment, availability domains are isolated from each other, fault tolerant, and very unlikely to fail simultaneously. Because availability domains do not share infrastructure such as power or cooling, or the internal availability domain network, a failure at one availability domain within a region is unlikely to impact the availability of the others within the same region.

In accordance with an embodiment, availability domains within the same region can be connected to each other by a low latency, high bandwidth network, which can provide high-availability connectivity to the internet and on-premises, and to build replicated systems in multiple availability domains for both high-availability and disaster recovery.

In accordance with an embodiment, regions are independent of other regions and can be separated geographically (e.g., across countries or continents). This then leads to the deployment of an application within a region where the application would most likely be utilized the most frequently.

In accordance with an embodiment, however, applications can also be deployed in different regions for various reasons. This can include, for example, risk mitigation when events, such as weather systems, take a region offline. In addition, applications can be deployed in other regions for strategic reasons, such as tax domains or other business or social criteria.

In accordance with an embodiment, there are several services that are available across regions. These include, for example, management services, compute services, storage services, edge services, and network services.

In accordance with an embodiment, compartments allow clients to organize and control access to cloud resources. A compartment is a collection of related resources (such as instances, virtual cloud networks, block volumes) that can be accessed only by certain groups that have been given permission by an administrator. A compartment can be thought of as a logical group and not a physical container. When working within a console, a compartment can act as a filter for what is allowed to be viewed.

In accordance with an embodiment, compartments can have several layers. For example, a tenancy 305 can be considered a root compartment that holds all of a client's cloud resources. Compartments can be organized in a hierarchical manner, such as compartment 360 being a level below the tenancy compartment, with sub compartment 370 being an additional layer below the compartment 360. In accordance with an embodiment, each compartment can be associated with one or more compartment policies, such as compartment policy 364, and sub compartment policy 375. Tenant compartment policy is not shown in the Figure.

In accordance with an embodiment, during, upon, or after creation of a compartment, or sub compartment, such as compartment 360 and sub compartment 370, a policy, such as compartment policy 365 and sub compartment policy 375 can be written/created for each compartment and sub compartment. Without a policy in place, access to the compartments and/or sub compartments can be restricted to users having permissions at the tenancy 305 level.

In accordance with an embodiment, upon creation of a compartment within a compartment (i.e., a sub compartment), the sub compartment inherits access permissions from compartments higher up its hierarchy.

In accordance with an embodiment, upon creation of a compartment or sub compartment policy, the policy can comprise a specification indicating which compartment the policy attaches to. Such a specification can contain controls limiting access for subsequence control, modification, or deletion of the policy. In some embodiments, the policies can be attached to a tenancy, a parent compartment, or the specific compartment to which the policy is directed.

In accordance with an embodiment, new resources can be placed into a compartment. This can be accomplished by specifying the targeted compartment upon creation of the new resource (the compartment is one of the required pieces of information to create a resource). This can be accomplished via a console interface.

In accordance with an embodiment, existing resources can also be moved to different compartments. Most resources can be moved after they are created. There are a few resources that you can't move from one compartment to another.

In accordance with an embodiment, some resources have attached resource dependencies and some do not. Not all attached dependencies behave the same way when the parent resource moves.

In accordance with an embodiment, for some resources, the attached dependencies move with the parent resource to the new compartment. The parent resource moves immediately, but in some cases attached dependencies move asynchronously and are not visible in the new compartment until the move is complete.

In accordance with an embodiment, for other resources, the attached resource dependencies do not move to the new compartment. Such attached resources can be moved independently.

In accordance with an embodiment, after a resource is moved to a new compartment, the policies that govern the new compartment apply immediately and affect access to the resource. Depending on the structure of the compartment organization, metering, billing, and alarms can also be affected.

In accordance with an embodiment, after creation, a compartment can be moved to, e.g., a different parent compartment within a same tenancy. Upon moving a compartment, all of the compartment's contents (including sub compartments and resources) are moved along with the compartment.

Figure 4:
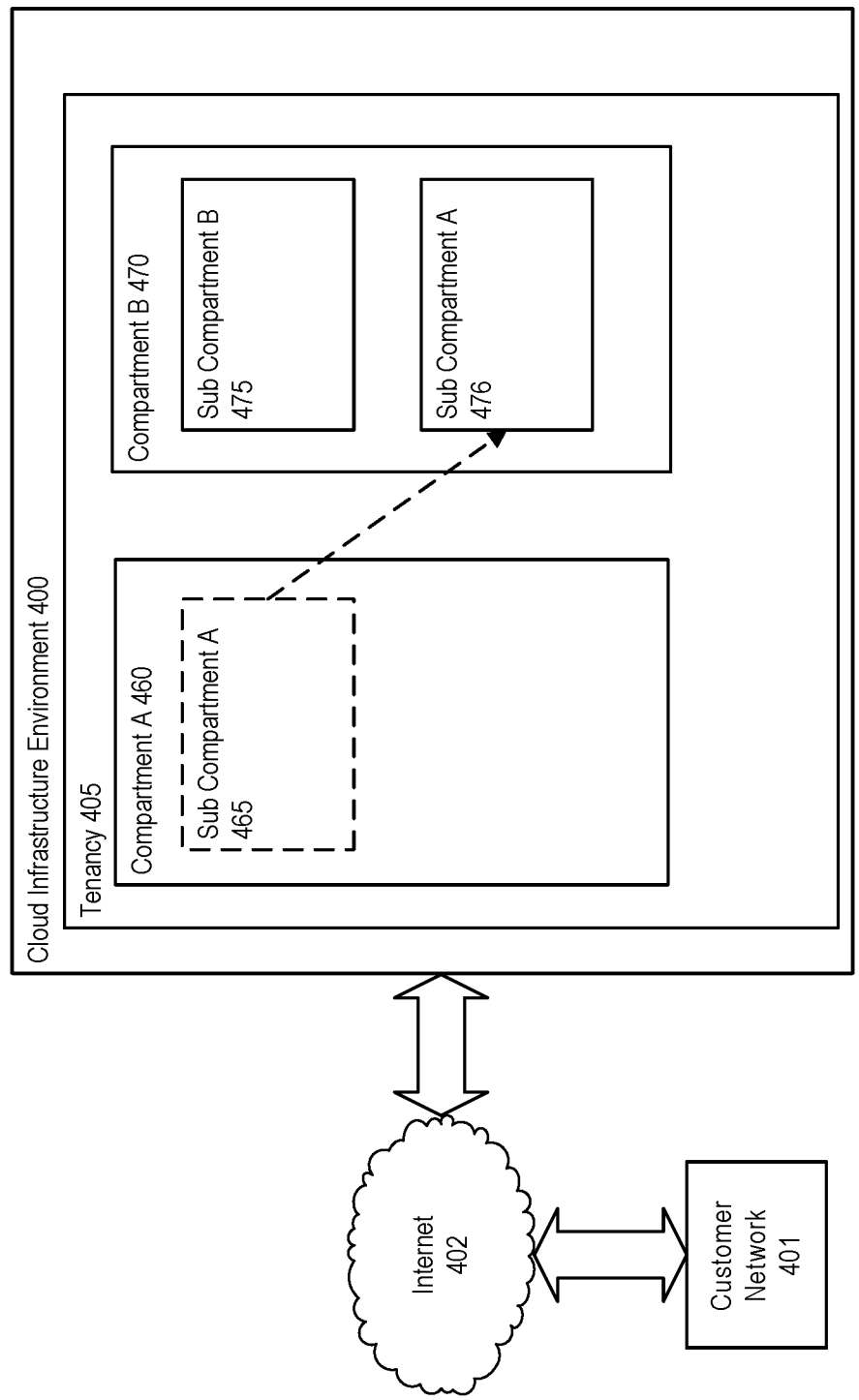
FIG. 4 shows a cloud infrastructure environment 400 illustrating relationships between compartments, compartment policies, sub-compartments, and sub-compartment policies when compartments are moved.

FIG. 4 illustrates a system for compartment migration within a cloud infrastructure environment, in accordance with an embodiment.

In accordance with an embodiment, as described above, instances of the cloud infrastructure environment 400 described above in FIG. 1 can be hosted in different regions. Compartments, such as tenancy 405, compartment A 460 and compartment B 470, can be defined within the cloud infrastructure environment, and these compartments can span across regions. Such compartments can be accessed, as described above, via a console, SDK, or APIs, by customer networks 401 via a network 402, such as the internet.

In accordance with an embodiment, a customer network 401 can comprise, for example, a single computer, a network of customer computers, or other such networks.

In accordance with an embodiment, compartments allow clients to organize and control access to cloud resources. A compartment is a collection of related resources (such as instances, virtual cloud networks, block volumes) that can be accessed only by certain groups that have been given permission by an administrator. A compartment can be thought of as a logical group and not a physical container. When working within a console, a compartment can act as a filter for what is allowed to be viewed.

In accordance with an embodiment, compartments can have several layers. For example, a tenancy 405 can be considered a root compartment that holds all of a client's cloud resources. Compartments can be organized in a hierarchical manner, such as compartment A 460 and compartment B 470 being a level below the tenancy compartment, with sub compartment A 465 being defined below compartment A, and sub compartment B 475 being defined below compartment B. In accordance with an embodiment, each compartment can be associated with one or more compartment policies (not shown).

In accordance with an embodiment, compartments defined within a tenancy, for example, can be moved by, for example, re-defining a compartment or sub-compartment.

In accordance with an embodiment, in order to move a compartment, a request with sufficient permissions can be received. That is, a request from a user belonging to a group that has, for example, a "manage all-resources" permissions on the lowest shared parent compartment to the current compartment and the destination compartment of the moving compartment.

That is, for example, a request to move sub-compartment A 465 from compartment A 460 to compartment B 470 must be received from a user with sufficient permissions. Because the tenancy 405 is the lowest shared parent compartment of both the source compartment, compartment A 460, and the destination compartment, compartment B 470, then the request to move sub-compartment A, as shown in the Figure, must be received from a user having "manage all-resources" permissions within the tenancy 405 compartment.

In accordance with an embodiment, in another example, if the request to move sub-compartment A 465 from compartment A to compartment B was received from a user having "manage all-resources" permissions within compartment A only, then the request may fail as the request from the user cannot manage resources within the destination compartment, namely compartment B.

In accordance with an embodiment, upon moving a compartment to a new parent compartment, the access policies of the new parent take effect and the policies of the previous parent compartment no longer apply. In some cases, when moving nested compartments with policies that specify the hierarchy, the polices can be automatically updated to ensure consistency.

In accordance with an embodiment, therefore, a compartment policy of compartment A 460 which was previously applied to sub-compartment A would no longer apply on migration of the sub-compartment A to compartment B. Then, a compartment policy of compartment B would apply to sub-compartment A instead. This is explained more in the description following Figure.

Figure 5:
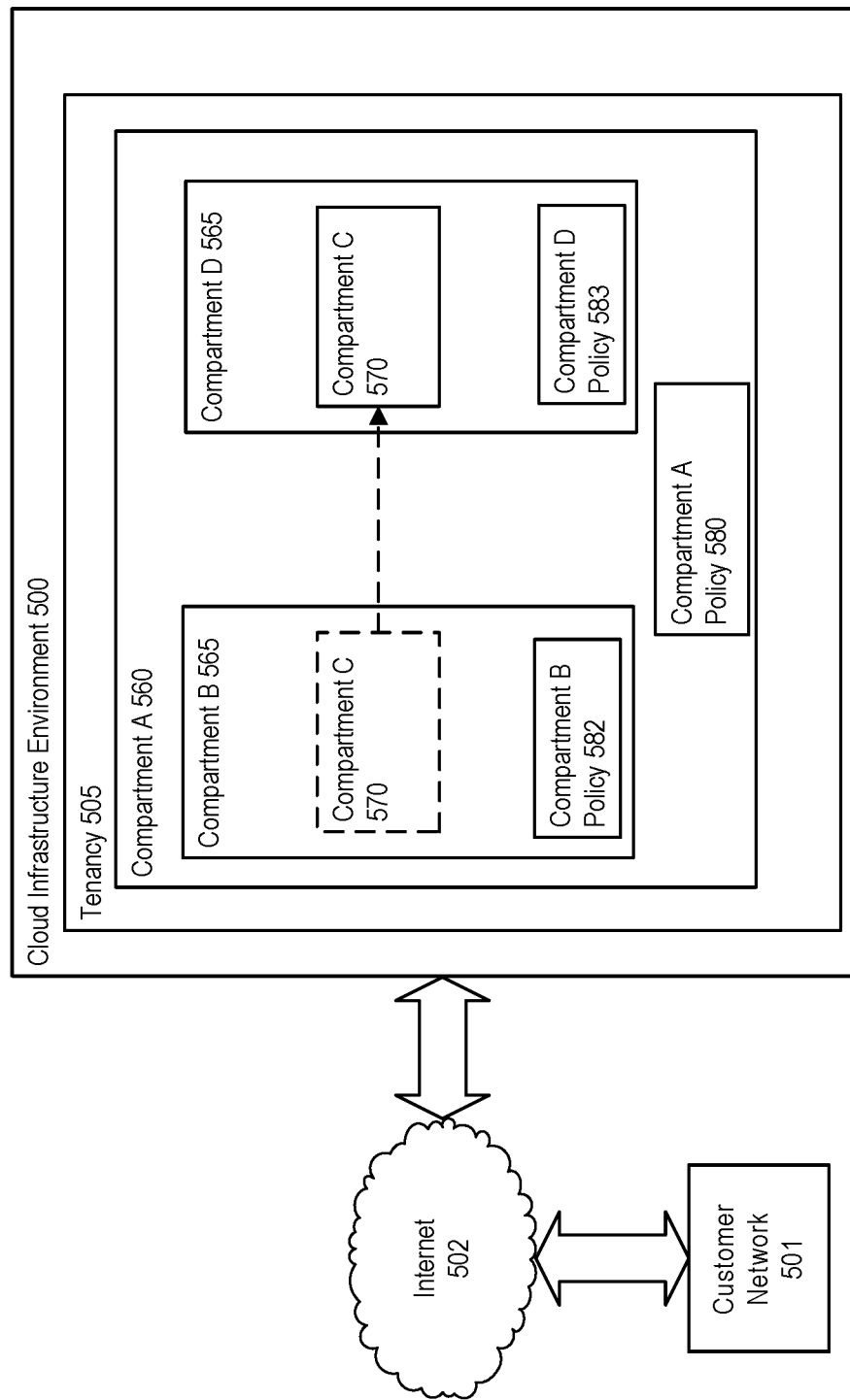
FIG. 5 shows a cloud infrastructure environment 500 illustrating implication of policies when moving compartments.

FIG. 5 shows a system for policy management and enforcement during compartment migration within a cloud infrastructure environment.

In accordance with an embodiment, and more specifically, FIG. 5 shows a compartment hierarchy in which a compartment is moved, and the consequences for different policies.

In accordance with an embodiment, as described above, instances of the cloud infrastructure environment 500 described above in FIG. 1 can be hosted in different regions. Compartments, such as tenancy 505, compartment A 560 and compartment B 565, and compartment D 566 can be defined within the cloud infrastructure environment, and these compartments can span across regions. Such compartments can be accessed, as described above, via a console, SDK, or APIs, by customer networks 501 via a network 502, such as the internet.

In accordance with an embodiment, a customer network 501 can comprise, for example, a single computer, a network of customer computers, or other such networks.

In accordance with an embodiment, compartments can have several layers. For example, a tenancy 505 can be considered a root compartment that holds all of a client's cloud resources. Compartments can be organized in a hierarchical manner, such as compartment A 560 being a level below the tenancy. Compartments B 565 and compartment D 566 are then organized as being yet another level below compartment A 560, while sub-compartment C 570 is shown as being originally a level below compartment B. In accordance with an embodiment, each compartment can be associated with one or more compartment policies, such as compartment B policy 582, compartment A policy 580, and compartment D policy 583. Such policies can govern, for example, user/client permissions for access to the compartments, as well as permissions for access to and control of resources within any given compartment. As described above, compartment policies can add to each other (i.e., "stack"), such that a user accessing compartment B 565 would have their interactions with compartment B 565 being governed by/limited by compartment B policy 582 in addition to compartment A policy 580.

In accordance with an embodiment, for example, suppose that compartment B policy 582 allows a group, group 1, to manage the instance-family in compartment A-B (the compartment hierarchy comprising compartment B being a sub compartment of compartment A).

In accordance with an embodiment, suppose also that compartment D policy 583 allows another group, group 2, to manage the instance family in compartment A-D (the compartment hierarchy comprising compartment D being a sub compartment of compartment A).

In accordance with an embodiment, upon compartment C being moved from compartment B to compartment D, members of group 1 can no longer manage instance families in compartment C, while members of group 2 can now manage instance families in compartment C.

In accordance with an embodiment, in certain situations, upon moving a compartment, certain policies can be automatically updated. Policies, for example, that specify the compartment hierarchy down to the compartment being moved can be automatically be updated when the policy is attached to a shared ancestor of the current and target parent.

Referring back to FIG. 5, for example, in accordance with an embodiment, suppose that compartment A policy allows members of a group, group X, to manage buckets in compartment B:C. On moving compartment C to compartment D, because of the shared ancestor (compartment A) between compartments B and D, then the compartment A policy can be automatically updated to allow members of group X to manage buckets in compartment D:C.

In accordance with an embodiment, polices attached to tenancies can be likewise automatically updated upon a compartment moving within the tenancy.

In accordance with an embodiment, however, not all policies are automatically updated upon a compartment moving. For example, in referring to FIG. 5, in the situation where compartment C is moved from compartment B to compartment D. Suppose that the compartment B policy allows management of buckets in compartment C (prior to moving). When compartment C is moved, then, compartment B policy is not automatically updated. Instead, the policy is no longer valid and can be removed (e.g., manually or automatically).

Tag Based Resource Limits/Quotas

In accordance with an embodiment, cloud administrators do not generally have the ability to restrict resource usage in existing clouds. Granting a user permission to create resources allows them to create any number of resources up to a predefined account limit. Tag based resource limits or quotas allow restrictions to be placed on the ability to create or use resources within a compartment to the appropriate level allowing fine-tuned cost control.

In accordance with an embodiment, customers can be assigned service level limits defined by the cloud infrastructure environment at account creation time. These service level limits restrict the total number of resources a customer can create across the entire tenancy (e.g., across multiple regions with multiple compartments). Tenancy and compartment administrators can utilize tag based resource limits or quotas to set resource-specific hard limits. Without such compartment limits on individual resources, a user that is authorized to launch instances can consume all available capacity in the entire tenancy. Tag based resource limits or quotas solve this problem and, unlike service limits, are set and customized by the clients and customers via, e.g., a console, SDK, or API. Tag based resource limits or quotas can be applied on top of the service limits and inherited through the nested compartment hierarchy. This allows cloud administrators to limit resource consumption and set boundaries around acceptable resource use.

In accordance with an embodiment, tag based resource limits or quotas give tenant and compartment administrators better control over how resources are consumed in a cloud infrastructure environment, enabling administrators to easily allocate resources to users or to groups of users by means of, for example, a console, SDK, or API. Compartment quotas are a powerful toolset to manage client spending in within tenancies.

In accordance with an embodiment, when a client has resources (for example, instances, VCNs, load balancers, and block volumes) across multiple compartments in their tenancy, it can become difficult to track resources used for specific purposes, or to aggregate them, report on them, or take bulk actions on them. Tagging allows clients to define keys and values and associate them with resources. Tags can be used to assist in organizing and listing resources. There are, in general, two types of tags: free-form tags and defined tags, although other types of tags are also possible in accordance with the example embodiments.

In accordance with an embodiment, free-form tags can consist of a key and a value. For example, "environment: production" is an example of a free-form tag, where "environment" is the key, and "production" is the value. Multiple free-form tags can be applied to a single resource.

In accordance with an embodiment, defined tags provide more features and control than free-form tags. Before clients create a defined tag key, a tag namespace can be set up for the defined tags. The namespace can be thought of as a container for a set of tag keys. Defined tags support policy to allow control over who can apply your defined tags. The tag namespace is an entity to which clients can apply policy.

In accordance with an embodiment, to apply a defined tag to a resource, a user can first select the tag namespace, then the tag key within the namespace, and then the user can assign the value. Administrators can control which groups of users are allowed to use each namespace. In accordance with an example embodiment, the tags may be applied to the resources as they are created. In another embodiment, the tags may be applied to resources after they are provisioned, thereby allowing for retroactive enforcement of resource quotas or limits in systems using the tags. In accordance with an embodiment, the tags may be used to enable cost governance and/or resource governance. In that way, the tags may be used to track costs.

Figure 6:
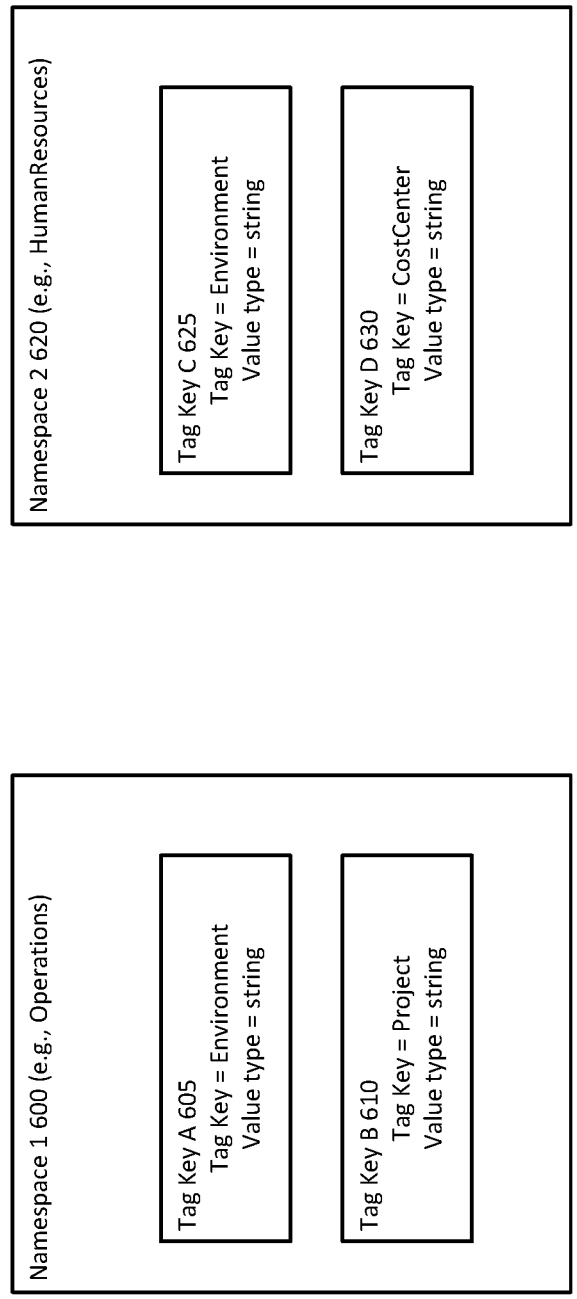
FIG. 6 shows a pair of defined tags, in accordance with an example embodiment.

FIG. 6 shows two defined tags, in accordance with an embodiment. Two tag namespaces are set up, namespace 1 600 and namespace 2 620 (e.g., namespace 1 can be "Operations" and namespace 2 can be "HumanResources"). The tag keys 605, 610, 625, and 630, are defined in the namespaces. Within each namespace, the tag keys can be unique, but a tag key name can be repeated across namespaces. For example, both namespaces can include a key named "Environment".

In accordance with an embodiment, many cloud providers offer service limits so as to protect from the capacity shortages. However, many times, clients want to also set limits so that they do not run themselves into resource overages. One such approach is to specify the limits at a group level. A group can contain a set of users, resources or anything that users want to specify. The group level limits are set by the administrators/users of a particular tenancy/account.

In accordance with an embodiment, as an example, tenancy administrators or group administrators can configure limits at a group level to control their cloud costs. This gives assurance to a customer/company that a particular group does not exceed the usage limits that are set by the tenancy or account administrators as cloud resources emit usage data which gets converted to the dollar cost associated with the resources(s) that are created within that group. In this sense, the groups can be thought of as cost center groups since all of the cloud costs for the resources(s) that are created by members of that group are allocated to the customer/company as a single aggregated lump charge or aggregated against a single group account, or the like.

In accordance with an embodiment, an issue, however, exists as there are very simple mechanisms for administrators to control costs. As an example, administrators can include or exclude a specific group from resource overages, or they can exclude a specific user to create resources by denying access. However, these are coarse grained mechanisms, and customers do not generally have the ability to specify fine grained mechanisms that gives them flexibility and better control to manage their cloud resources.

In accordance with an embodiment, a fine grained approach can provide resource limits based on tags, wherein all of the resources that may be provisioned by one or more members of a particular group is associated or is otherwise provided with a cost center tag that is representative of the group. Cost center tags of this nature provide a mechanism for use in resource governance, and cloud providers also use them for cost governance. Systems and methods can create a mechanism to control costs at a group level through tags. As an example, users can specify a fine grained rule/policy such as:

Set limits <resource type> to 10 in group A where target.resource.tag="finance"

In accordance with an embodiment, tags can be associated with a resource, and with the approach above, tags can protect customers from resource overages at a group level. In the example above, a user member of the will not be able to create more than 10 instances of a <resource type> when the tag value is "finance" in a group A. This approach of limiting costs at a group level provides fine grained mechanism to clients to better manage costs and resource usage.

In accordance with an embodiment, a system provides resource request context tag based limits/quotas in a cloud infrastructure environment. The system performs a method for limiting or imposing quotas on provisioning resources in a cloud infrastructure environment based on request contexts.

In accordance with an embodiment, a system provides tag based resource limits/quotas in a cloud infrastructure environment. The system performs a method for limiting or imposing quotas on provisioning resources in a cloud infrastructure environment based on resource tags.

In accordance with an embodiment, in a highly secured environments, customers want to secure access to the resources and their data. As an example, customers protect their resources by classifying them as Highly Confidential, Confidential, Restricted, Public etc., and grant access to users based on their clearances per constraints. Users who have access to the classified resources/data need to be extremely careful in accessing data to ensure there is no information leakage and to avoid inadvertent modifications to resources across data classifications within a shared context. Embodiments herein provide an improved systems and methods for that enable users to restrict access or modify resources within a data classification boundary for a given session/context even though the user may otherwise have higher access.

In accordance with an embodiment, cloud architectures can use role-based access control techniques by slotting users within roles to restrict/allow access to specific security boundaries. However, the techniques are coarse grained. The accountability is on the user to be diligent and careful in what they are accessing, modifying or executing.

In accordance with an embodiment, the presently disclosed systems and methods protects users from accessing resources to perform certain operations when they don't intend to. One example is accessing other classifications of data when the user has access to highly classified resources. For example, suppose a user has a script that only needs to access resources which are not classified by filtering out the highly classified ones. Here, user/script has to know which data/resource is classified and which is not.

In accordance with an embodiment, another example is when a user is only interested in shutting down infrastructure that is not business critical after close of business, but wants to keep running other resources that are business critical. Here, user has to know exactly which instances to turn off.

In accordance with an embodiment, the systems and methods herein provide a solution to such issues via tags that are attached to the one or more requests for resources. Requests from a script performs operations on the behalf of the user e.g. shutting down the instance, read the details of the resource, update the resource, access a classified resource etc. A user sends these requests with one or more tags that are attached to the request context. When requests perform actions on resources, these tags from the request context can be inspected, and then access can either be denied or granted to perform the operation that user wants to perform, even if initially user had access to perform that operation. This avoids unintentional access to highly classified data or resources by doing an operation that user did not intend for that specific resource(s). This can fall under tag-based automation. It can cater to wide variety of use cases, not just in the areas related to security.

In accordance with an embodiment, tags representative of a resource request context can be used to create security boundaries via tags when resources are accessed by sending requests.

In accordance with an embodiment, when a user wants to access a resource to perform a certain operation, the user can generally make a call through a software development kit or will make an API call directly. The user can pass one or more tags which are added to the request which is sent to the resource. While authorizing the user, the resource implementation can inspect tags associated with the request, if the tag matches with the user tags, then the request is allowed, otherwise the request is rejected/denied.

Figure 7:
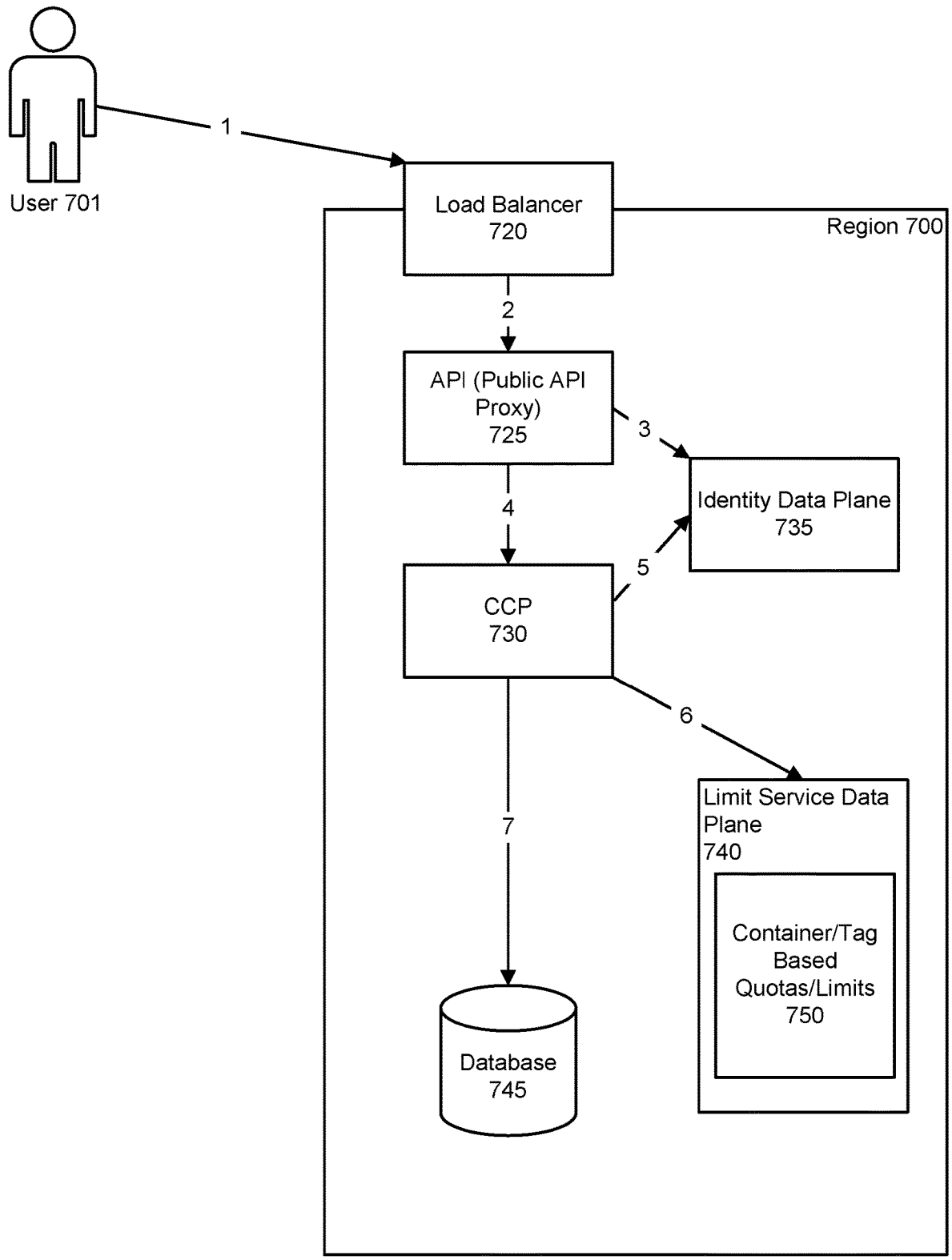
FIG. 7 shows an architecture of a system enforcing quotas or limits on resources in a cloud infrastructure environment based tags including for example resource tags and resource request context tags, in accordance with example embodiments.

FIG. 7 shows an architecture flow for a user launching an instance in a system enforcing quotas or limits on resources in a cloud infrastructure environment based tags including for example resource tags and/or resource request context tags, in accordance with example embodiments.

In accordance with an embodiment, at step 1, a user 701 requests to launch an instance in region 700, where the request is associated with one or more tags (e.g., a free form tag or a defined tag) that is defined within region 700. In an example embodiment, the tag is representative of a context of a request from the user for a resource.

In accordance with an embodiment, at step 2, a load balancer 720 forwards the request to an API, such as a public proxy API 725.

In accordance with an embodiment, at step 3, the API performs an authentication at the identity data plane 735.

In accordance with an embodiment, at step 4, the request to launch the instance can be forwarded to compute control plane (CCP) 730. The CCP can then additionally authenticate the request at the identity data plane at step 5.

In accordance with an embodiment, at step 6, the compute control plane can fetch, from the limit service data plane 740 (alternatively, the fetch operation can be performed at a resource control plane) all tag-based limits/quotas 750 associated with the tag that is part of the request from user 701. Such tag-based quotas can apply across, for example, an entire tenancy and does not have to be compartment specific.

In accordance with an embodiment, at step 7, the compute control plane can check to see if the requested usage would violate any of the tag-based limits/quotas for any in 750. If the requested usage does not violate any compartment quota, then the request can be processed to, for example, the database 745. If the requested usage would violate any of the tag-based limits/quotas along the compartment tree, then the request can be dropped and a message can be sent to notify the user.

In accordance with an embodiment, tag-based limits/quotas are applied across, for example, an entire tenancy, including all regions in which the tenancy is enabled. compartments within the tenancy. When determining whether the requested instance would violate any tag-based limits/quotas, the CCP can ensure that the new request, for example via a service developers kit (SDK), doesn't violate any of the quotas. If the request would exceed a quota, CCP can fail the request.

In accordance with an embodiment, the SDK of the CCP can be present in every control plane of the cloud infrastructure environment.

In accordance with an embodiment, the CCP can work in conjunction with the limit service data plane to check a new request against a tag-based limit/quota.

In accordance with an embodiment, when a client triggers an operation to create a cloud resource, the request goes to the resource control plane. The resource control plane asks from a limits service to know if the resource can be safely spun up considering the limits that are configured at a group level. If the limits server returns a negative/failure response to the resource control plane, then the resource is not created.

Internally when limits service receives the request, it checks the tag that is associated with the resource creation, and looks up into a store or a database or in the memory to see the current usage of the resource with that specific tag. If the tag value exceeds the limits that are configured at a group level, it sends a failure/negative response to the resource control plane so that resource creation fails.

Using Tags for Resource Limits/Quotas

Figure 8:
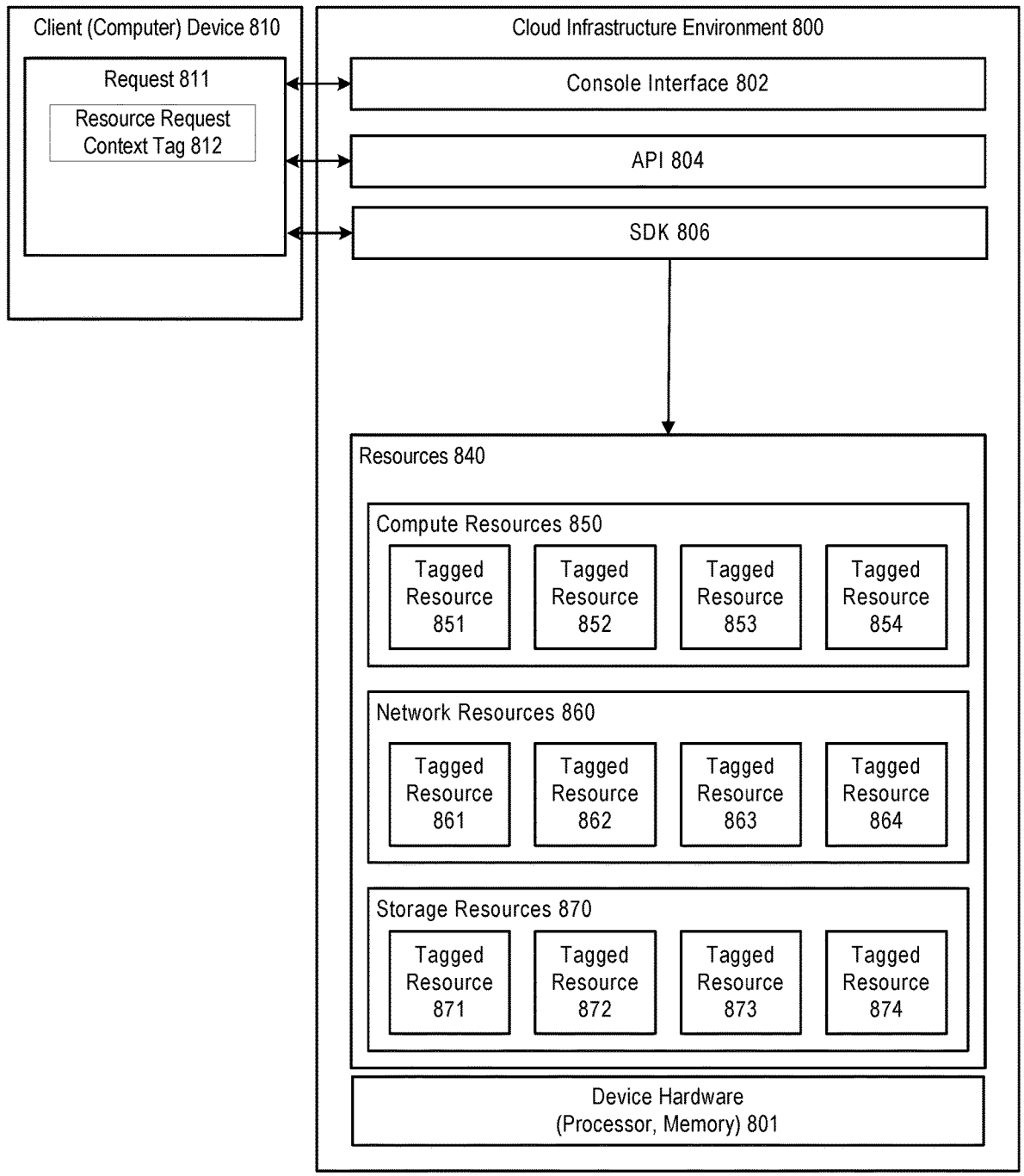
FIG. 8 shows a system using request context tags and/or resource tags for limiting usage such as of provisioning of resources in a cloud infrastructure environment.

FIG. 8 shows a system using request context tags and/or resource tags for limiting usage such as of provisioning of resources in a cloud infrastructure environment.

In accordance with an embodiment, a client device 810 can submit a request 811 to the cloud infrastructure environment, wherein the request is associated with a tag 812 such as for example, a tag representative of a context of the request. The client device can submit the request to the cloud infrastructure environment 800 (running on device hardware 801) via one of the interfaces, such as the console 802, API 804, or a SDK 806.

In accordance with an embodiment, the request can be forwarded to the resources 840, which can comprise a number of layers (as described above), such as compute resources layer 850, comprising tagged resources 851-854, a network resources layer 860, comprising tagged resources 861-864, and a storage resources layer 870, comprising tagged resources 871-874.

In accordance with an embodiment, where the client device enjoys a high security/priority privilege (e.g., fraud protection, or intelligence), the client device can utilize a wide range of tags for the request. As an example, tags associated with requests can be used to assist a user from touching protected resources by mistake. For instance, suppose every day certain compute resources can be shut down after 6 pm to save costs. Such compute resources have a low-secure tag. However, the same system also has other compute resources that cannot be shut down (must be run 24/7). Such compute resources have a high-secure tag. In order to shut down the low privilege compute resources, the user, without having tagged requests, would have to go each resource and select only those resources to be shut down, or write a script to do so, so as to avoid shutting down the highly privileged resources that need to run 24/7. This is hard to maintain this as compute resources can be added and removed every day.

In accordance with an embodiment, then, the user can instead provide a tagged request to shut down the low privilege resources. That is, the tag associated with the request would share a low-secure tag with the compute resources that can be shut down at 6 pm. Then, the tagged can go to all resources in the network, but it will bypass the highly protected resources that do not have the tag that the request has. In such a way, the tagged request to shut down compute resources only shuts down those compute resources where the low-secure tag matches, and the request bypassed high-secure tagged compute resources.

In accordance with an embodiment, as another example, suppose the client 810 wants to attach a highly secure compute instance to a block volume. In such a situation, the request to attach the highly secure compute instance can be tagged with a high-secure tag. Then, by doing so, this can ensure that the highly secure compute instance is not attached to a block volume that has a lower secure tag, and instead can the request can only attach the highly secure compute instance to a similarly tagged (highly secure) block volume. In other words, the request will not attach the highly secure compute to a low secure block volume (tag check will fail).

Request Context Tag Based Limits/Quotas

Figure 9:
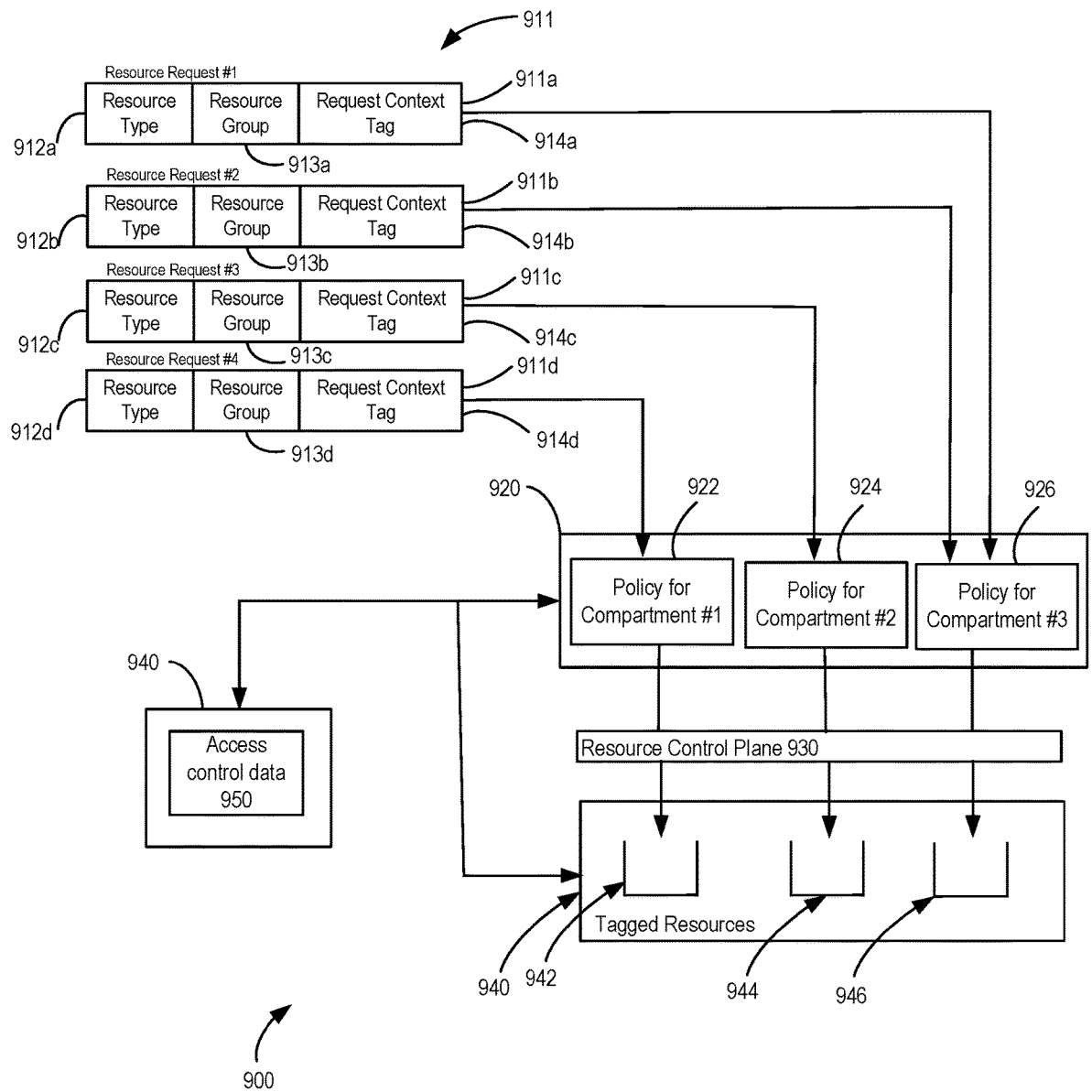
FIG. 9 is a functional schematic of a system providing resource request context tag based limits/quotas in a cloud infrastructure environment in accordance with an embodiment.

FIG. 9 is a functional schematic of a system 900 providing resource request tag based limits/quotas in a cloud infrastructure environment in accordance with an embodiment. In general, a client device 810 (FIG. 8) can submit requests 911 to the cloud infrastructure environment for provisioning a new resource among a plurality of tagged resources 940. The plurality of tagged resources 940 may be, for example, any of the tagged compute resources 851-854 of the compute resources layer 850, the tagged network resources 861-864 of the network resources layer 860, and/or the tagged storage resources 871-874 of the storage resources layer 870.

In accordance with example embodiments, the resources are items that are provisioned in the cloud infrastructure environment may be of various types that may include for example, compute resource types, storage service resource types, VCN service types, IP Address service types, DNS service types, DDoS service protection types, and email delivery service types, to name a few. The example embodiments herein are not limited to these particular resource types, and other types may be includes as well, wherein further resource type examples are noted by way of example below.

Example Resource Types

Compute
Storage
VCN
IP Address
DNS

In accordance with an example embodiment, the resources and services that are provisioned are tagable. In the example embodiment, the requests for resources and the resources are associated with one or more tags. In addition, the resources may be grouped based on their tag values. Essentially, in the example embodiment, the resource tags associated with each provisioned resource, are key value pairs that may be attached to or otherwise associated with the provisioned resources in the cloud infrastructure environment. The tag key value pairs may be used for many purposes including for example various accounting purposes. In an example, the resource key value pair tags associated with the provisioned resources are used to group the resources wherein the groupings provided by the resource tags enable cost governance and/or resource governance of everything of value in the cloud infrastructure environment.

The resources provisioned in the cloud infrastructure environment may be grouped in containers 942, 944, 946 based on the tag values assigned to each resource or based on other criteria as may be necessary or desired. As an example, a first container 942 may store compute and storage resources that have been provisioned in the cloud and associated with an Accounting group of the client user 701 (FIG. 7), the second container 944 may hold compute resources that have been provisioned in the cloud and associated with an Operations group of the client user 701, and a third container 946 may hold compute resources that have been provisioned in the cloud and associated with a Human Resources group of the client user 701. The example embodiments herein are not limited to these groups and other groups may be used as well, wherein further example groups are noted by way of example below.

Example Resource Groups

Operations
Human Resources
Finance
Accounting
Legal
Marketing

In accordance with an example, the resource instances are logically arranged into the different containers 942, 944, 946 thereby providing separate cost centers, and each cost center is assigned a tag value, wherein the end user may be charged for access to the various cost centers wherein the tags of the cost centers are used for the cost governance and accounting. Some customers may model multiple cost centers within their end group price. There may be a separate tag for each cost center, and the cloud may assign a limited set of resources against each tag.

In an example embodiment, one or more policies 920 provide a mechanism for end users to protect themselves from accessing more resources than is permitted in a standard contract for access, wherein substantial overages may occur by the end user accessing more resources that are permitted under standard contract terms of the standard contract. For example, the customer may send a request for resources that activate via the resource control plane 930 the provisioning of multiple compute resources, such as for example 100 compute resources, wherein the contract terms only permit the provisioning of 90 computer resources for the standard rate, and wherein any overages, 10 in the example, incurs additional expense to the customer end user.

As noted above and in accordance with an embodiment, a fine grained approach can provide resource limits based on tags. Tags are a mechanism which are mainly used in the resource governance, and cloud providers also use them for cost governance. Systems and methods can create a mechanism to control costs at a group level through tags. As an example, users can specify a fine grained rule/policy such as:
Set limits <resource type> to 10 in group A where target.resource.tag="finance"

In accordance with an embodiment, tags can be associated with a resource and with a request for the resource or both, and with the approach above, tags can protect customers from resource overages at one or more selected levels such as for example at a group level. In the example above, a user will not be able to create more than 10 instances of a <resource type> when the tag value is "finance" in a group A. This approach of limiting costs at a group level provides fine grained mechanism to clients to better manage costs and resource usage.

In accordance with an example embodiment, a first policy 922 protects customers from resource overages at the group level for the resources grouped in the first container 942. Similarly, a second policy 924 protects customers from resource overages at the group level for the resources grouped in the second container 944, and a third policy 926 protects customers from resource overages at the group level for the resources grouped in the third container 946.

In accordance with an example, each of the resource requests 911*a*-911*d* includes fields having data representative of a type of the resource instance being requested (Resource Type), data representative of a group of the resource instance being requested (Resource Group), and data representative of a context of the resource request (Context Tag). In this regard, each of the resource requests 911*a*-911*d* include resource type fields 912*a*-912*d* having data representative of a type of the resource instance being requested (Resource Type). In addition, each of the resource requests 911*a*-911*d* include resource group fields 913*a*-913*d* representative of a group of the resource instance being requested (Resource Group). In further addition, each of the resource requests 911*a*-911*d* include a request context field 914*a*-914*d* including request context data representative of a context of the resource request (Context Tag).

In accordance with an example, the compute control plane can fetch, from the limit service data plane 740 (FIG. 7) (alternatively, the fetch operation can be performed at a resource control plane 930) all tag-based limits/quotas 950 associated with the tag that is part of the request from user 701. Such tag-based quotas can apply across, for example, an entire tenancy and does not have to be compartment specific.

In accordance with an embodiment, the compute control plane can check to see if the requested usage would violate any of the tag-based limits/quotas for any quota or limit rules in the memory 950. If the requested usage does not violate any compartment quota, then the request can be processed to, for example, the database. If the requested usage would violate any of the tag-based limits/quotas along the compartment tree, then the request can be dropped and a message can be sent to notify the user.

In accordance with the example embodiment, tag-based limits/quotas are applied to compartments within the tenancy. In accordance with an example embodiment to be described below, the tag-based limits/quotas are applied across, for example, an entire tenancy, including all regions in which the tenancy is enabled, essentially spanning multiple compartments. When determining whether the requested instance would violate any tag-based limits/quotas, the compute control plane can ensure that the new request, for example via a service developers kit (SDK), doesn't violate any of the quotas. If the request would exceed a quota, compute control plane can fail the request.

In accordance with an embodiment, the SDK of the compute control plane can be present in every control plane of the cloud infrastructure environment. In accordance with an embodiment, the compute control plane can work in conjunction with the limit service data plane to check a new request against a tag-based limit/quota.

In accordance with an embodiment, tags can be associated with a resource and with a request for the resource or both, and with this approach, tags can protect resources from inadvertent access and can also protect customer users from inadvertent resource overages.

In this regard, a system 900 is provided using request context tags 914a-914d for control of handling of resources 940 in an associated cloud infrastructure environment. The system may include one or more computers comprising one or more microprocessors defining a tenancy in the associated cloud infrastructure environment. In the example embodiment, a memory device 940 operatively coupled with the computer stores logic executable by the computer for providing the control of handling of resources in the tenancy. The memory device may also store access control data 950 representative of a plurality of required credential gate levels for permitting handling of the resources in the tenancy. A request 911a-911d to handle a first resource in the tenancy may be received, wherein the request 911a-911d includes request context tag data 914a-914d representative of request context information of the request. A first privilege level classification associated with the requested first resource is determined, and the request context information of the request is compared against a first required credential gate level of the plurality of required credential gate levels for permitting handling of resources in the tenancy having the first privilege level classification. In accordance with the example embodiment, the request to handle the first resource is selectively granted based on the request context information matching the first required credential gate level.

The request to handle the first resource may include a request to provision the first resource in the tenancy. In accordance with the example embodiment, the first resource is selectively provisioned in the tenancy based on the request context information matching the first required credential gate level.

In accordance with the example embodiment, the request to provision the first resource in the tenancy may include a request from a user of the system to provision a bare metal compute instance in the tenancy for providing control to the user of one or more physical host machines within a compute resource layer in the associated cloud infrastructure environment. In this example, the request context tag data of the request includes user context tag data 913a-913d representative of user identification information of the user. The access control data stored in the memory device comprises user access control data representative of a plurality of user required credential gate levels for permitting handling of the resources in the tenancy, wherein the user identification information of the user is compared against a first user required credential gate level of the plurality of user required credential gate levels for permitting handling of the resources in the tenancy having the first privilege classification. In the example, the bare metal compute instance is selectively provisioned to the user in the tenancy based on the user identification information of the user matching the first user required credential gate level.

In accordance with the example embodiment, the request to provision the first resource in the tenancy may include a request to provision a plurality of resources in the tenancy having the first privilege level classification. In this case, the plurality of resources in the tenancy are selectively provisioned based on the request context information matching the first required credential gate level.

In accordance with the example embodiment, the request context tag data of the request may include user context tag data 913a-913d representative of user identification information of the user, and the request to handle the first resource may include a request to handle all resources provisioned in the tenancy and associated with a second privilege level classification. The system 900 operates to compare the user identification information of the request against a second required credential gate level of the plurality of required credential gate levels for permitting handling of resources in the tenancy having the second privilege level classification. The system 900 selectively grants the request to handle all of the resources provisioned in the tenancy associated with the second privilege level classification based on the user identification information matching the second required credential gate level.

In accordance with the example embodiment, the tenancy may include a plurality of compartments 942, 944, 946 storing the resources associated with the second privilege level classification, wherein each compartment of the plurality of compartments provides isolation of a set of the resources associated with the second privilege level classification within the compartment relative to one or more other sets of the resources associated with the second privilege level classification in the other compartments. The system 900 selectively grants the request to handle all of the resources provisioned in the tenancy associated with the second privilege level classification spanning the plurality of compartments and based on the user identification information matching the second required credential gate level.

The request context data of the request received by the system to handle the first resource in the tenancy may include one or more of resource type data 912a-912d representative of a type of the resource instance being requested and/or resource group data 913a-913d representative of a group of the resource instance being requested.

In accordance with an embodiment, when a client triggers an operation to create a cloud resource, the request goes to the resource control plane. The resource control plane asks from a limits service to know if the resource can be safely spun up considering the limits that are configured at a group level. If the limits server returns a negative/failure response to the resource control plane, then the resource is not created.

Internally when limits service receives the request, it checks the tag that is associated with the resource creation, and looks up into a store or a database or in the memory to see the current usage of the resource with that specific tag. If the tag value exceeds the limits that are configured at a group level, it sends a failure/negative response to the resource control plane so that resource creation fails.

For purposes of describing a functionality of the example embodiments only an not for purposes of limiting same, the first policy 922 may protect customers from resource overages at the Finance group level for the resources grouped in the first container 942 in accordance with a fine grained rule/policy such as:
Set limits <Compute> to 10 in Container #1 (642) where target.resource.tag="Finance"

In the particular example above, a user will not be able to create more than 10 instances of a compute resource in the Finance container 942. In this way, a request 911d for provisioning a resource in the container 942 will be processed by the policy 922 to determine whether the request may be executed or otherwise performed without incurring any overages.

Similarly, the second policy 924 may protect customers from resource overages at the Operations group level for the resources grouped in the second container 644 in accordance with a fine grained rule/policy such as:
Set limits <db storage> to 100 in Container #2 (644) where target.resource.tag="Operations"

In the example above, a user will not be able to create more than 100 instances of a Storage resource in the Operations container 644. In this way, a request 911c for provisioning a resource in the container 944 will be processed by the policy 924 to determine whether the request may be executed or otherwise performed without incurring any overages.

Also similarly, the third policy 926 may protect customers from resource overages at the Human Resources group level for the resources grouped in the third container 946 in accordance with a fine grained rule/policy such as:

Set limits <Compute> to 10 and <db storage> to 100 in Container #3 (646) where target. resource. tag="Human Resources"

In the example above, a user will not be able to create more than 10 instances of a compute resource or more than 100 instances of a Storage resource in the Human Resources container 946. In this way, requests 911*a*, 911*b* for provisioning resources in the container 946 will be processed by the policy 926 to determine whether the request may be executed or otherwise performed without incurring any overages.

Figure 10:
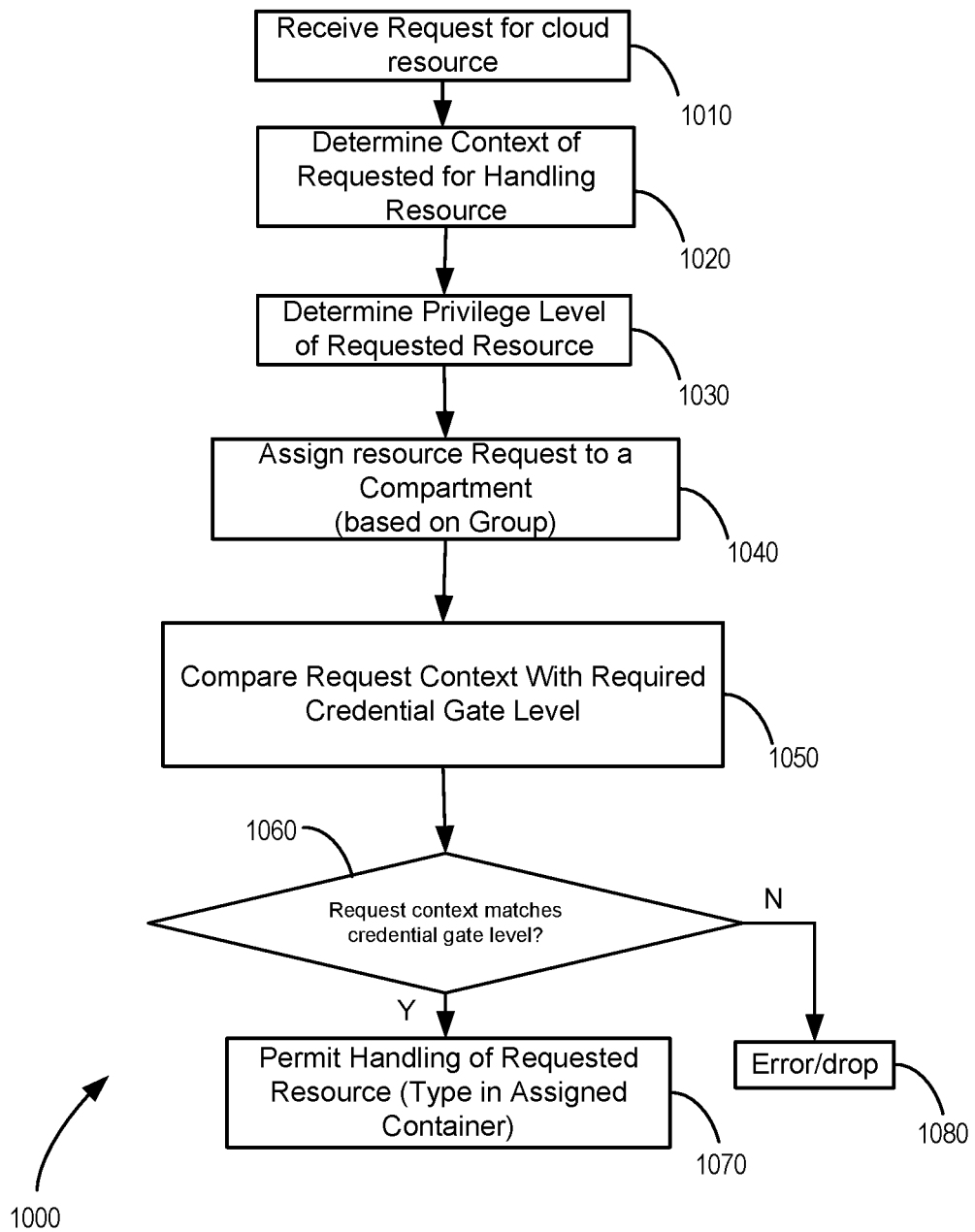
FIG. 10 is a flow diagram showing a method for limiting or imposing quotas on provisioning resources in a cloud infrastructure environment based on request contexts in accordance with an example embodiment.

FIG. 10 is a flow diagram showing a method 1000 for limiting or imposing quotas on handling resources such as for example on provisioning resources in a cloud infrastructure environment based on request contexts in accordance with an example embodiment. With reference now to that Figure, a request for provisioning a resource in the cloud infrastructure environment is received in step 1010. The request may be, for example the first request 911*a* described above. The request may include, for example, request context tag data 914*a* representative of request context information of the request.

The request 911*a* is inspected and a context of the request for the requested resource is determined at step 1020. The determined resource type may be, for example, a request for provisioning a compute resource type or a request for provisioning a storage resource type.

A privilege level classification associated with the requested resource is determined at step 1030. In accordance with the example embodiment, the resources may be stored in association with indicia reflective of a privilege level needed for accessing the resource. The privilege levels may be stored in or as one or more privilege level tags such as shown for example in FIG. 8 at 851-854, 861-864, 871-874 and in FIG. 1 at 140*a*, 16*a*, 170*a* for example. The determined resource group may be, for example, a request for provisioning a resource grouped in the Human Resources group for example.

An assignment may be made at step 1040 of the resource request 911*a* to a particular container in accordance with the determined group of the request. In the example, the resource request 911*a* may be assigned for example to the third container 946 in accordance with the example. The policy corresponding to the assigned compartment may be selectively applied to the resource request. In the example illustrated, the third policy 926 may be selectively applied to the resource request 911*a*. If it is determined in step 1040 that the provisioning of additional resources in accordance with the contents of the resource request 911*a* would not exceed the limits and/or quotas specified in the policy 926 assigned to the compartment 946, the instance requested in the request 911*a* may be created in the compartment 946.

In step 1050, the request context information 914*a* of the request 911*a* is compared against a first required credential gate level of the plurality of required credential gate levels for permitting handling of resources in the tenancy having the first privilege level classification.

If is determined in step 1060 that the request context information matches the first required credential gate level, the request to handle the first resource is granted in step 1070 and the resource may be handled such as for example, an instance of the requested resource may be created, the requested resource may be provisioned, the requested resource may be terminated or otherwise de-provisioned, or the like.

If is determined in step 1060 that the request context information does not match the first required credential gate level, the request to handle the first resource is dropped in step 1080.

Resource Tag Based Limits/Quotas

Figure 11:
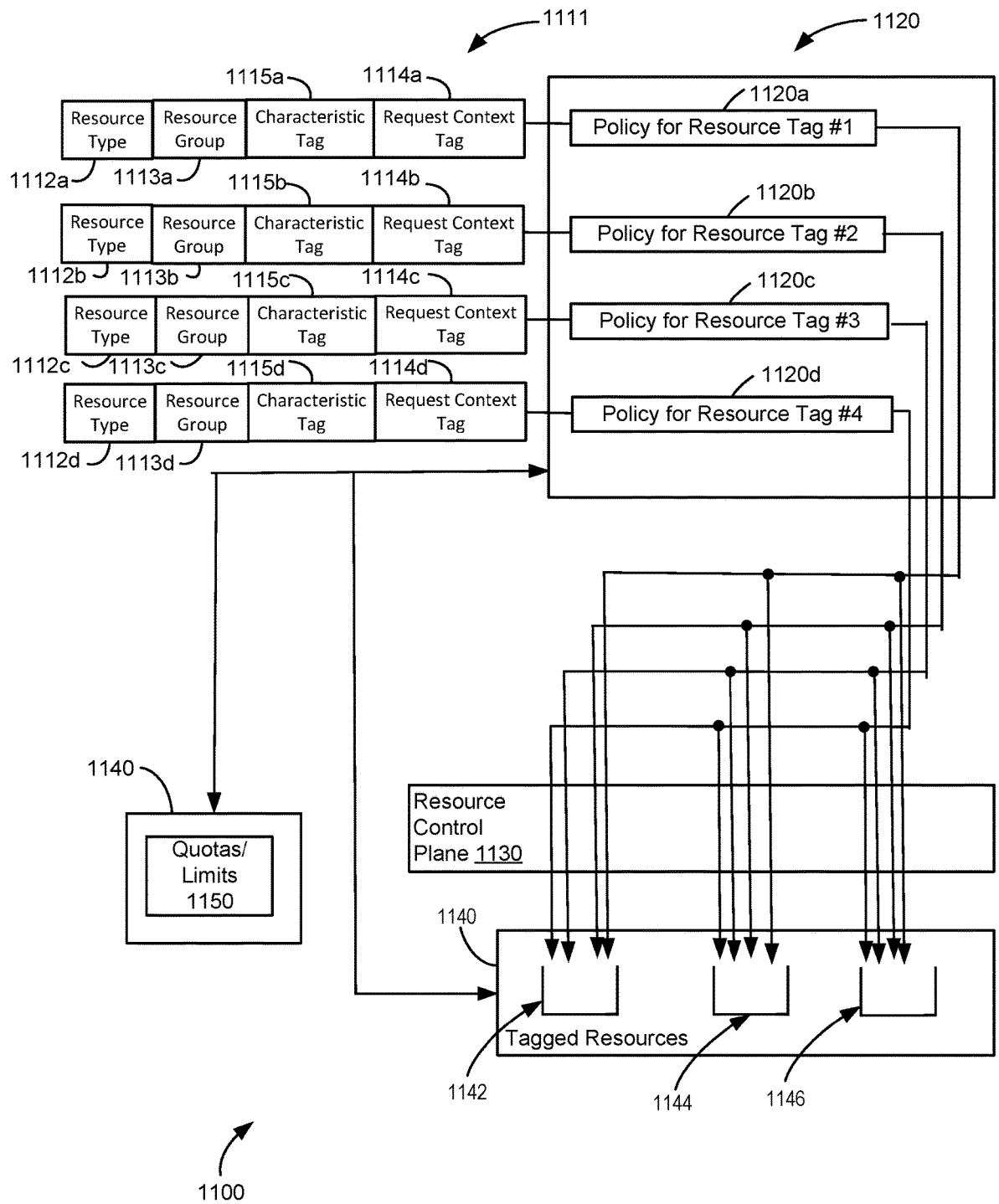
FIG. 11 is a functional schematic of a system providing tag based resource limits/quotas in a cloud infrastructure environment in accordance with an embodiment.

FIG. 11 is a functional schematic of a system 1100 providing tag based resource limits/quotas in a cloud infrastructure environment in accordance with an embodiment.

In general, a client device 810 (FIG. 8) can submit requests 1111 to the cloud infrastructure environment for provisioning a new resource among a plurality of tagged resources 1040. The plurality of tagged resources 1140 may be, for example, any of the tagged compute resources 851-854 of the compute resources layer 850, the tagged network resources 861-864 of the network resources layer 860, and/or the tagged storage resources 871-874 of the storage resources layer 870.

In accordance with an example embodiment, the resources and services that are provisioned are tagable. In the example embodiment, the resources are associated with one or more tags. In addition, the resources may be grouped based on their tag values. Essentially, in the example embodiment, the resource tags associated with each provisioned resource, are key value pairs that may be attached to or otherwise associated with the provisioned resources in the cloud infrastructure environment. The tag key value pairs may be used for many purposes including for example various accounting purposes. In an example, the resource key value pair tags associated with the provisioned resources are used to group the resources wherein the groupings provided by the resource tags enable cost governance and/or resource governance of everything of value in the cloud infrastructure environment.

The resources provisioned in the cloud infrastructure environment may be grouped in containers 1142, 1144, 1146 based on the tag values assigned to each resource.

In accordance with an example, the resource instances are logically arranged into the different containers 1142, 1144, 1146 thereby providing separate cost centers, and each cost center is assigned a tag value, wherein the end user may be charged for access to the various cost centers wherein the tags of the cost centers are used for the cost governance and accounting. Some customers may model multiple cost centers within their end group price. There may be a separate tag for each cost center, and the cloud may assign a limited set of resources against each tag.

In an example embodiment, one or more policies 1120 provide a mechanism for end users to protect themselves from accessing more resources than is permitted in a standard contract for access, wherein substantial overages may occur by the end user accessing more resources that are permitted under standard contract terms of the standard contract. For example, the customer may send a request for resources that activate via the resource control plane 1130 the provisioning of multiple compute resources, such as for example 100 compute resources, wherein the contract terms only permit the provisioning of 90 computer resources for the standard rate, and wherein any overages, 10 in the example, incurs additional expense to the customer end user.

As noted above and in accordance with an embodiment, a fine grained approach can provide resource limits based on tags and, in particular, on tags that are associated with the resources. Tags that are associated with the resources provide a mechanism that may be used in the resource governance 110 (FIG. 1), and cloud providers may also use them for cost governance. Systems and methods can create a mechanism to control costs at a level including at the group level through tags. As an example, users can specify a fine grained rule/policy such as:
Set limits <resource type> to 10 in group A where target.resource.tag="finance"

In accordance with an embodiment, tags can be associated with a resource, and with the approach above, tags can protect customers from resource overages at one or more selected levels such as for example at a group level. In the example above, a user will not be able to create more than 10 instances of a <resource type> when the tag value is "finance" in a group A. This approach of limiting costs at a group level provides fine grained mechanism to clients to better manage costs and resource usage.

In accordance with an example embodiment, a first policy 1120*a* protects customers from overages of resources that are associated with a first tag and that may be grouped in any of the containers 1142, 1144, 1146. Similarly, a second policy 1120*b* protects customers from overages of resources that are associated with a second tag and that may be grouped in any of the containers 1142, 1144, 1146. Also similarly, third and fourth policies 1120*c*, 1120*d* protect customers from overages of resources that are associated with a third and fourth tags and that also may be grouped in any of the containers 1142, 1144, 1146.

In accordance with an example, each of the resource requests 1111*a*-1111*d* includes fields having data representative of a type of the resource instance being requested (Resource Type), data representative of a group of the resource instance being requested (Resource Group), data representative of a characteristic of the resource request (Request Characteristic), and data representative of a context of the resource request (Context Tag). In this regard, each of the resource requests 1111*a*-1111*d* include resource type fields 1112*a*-1112*d* having data representative of a type of the resource instance being requested (Resource Type). In addition, each of the resource requests 1111*a*-1111*d* include resource group fields 1113*a*-1113*d* representative of a group of the resource instance being requested (Resource Group). In further addition, each of the resource requests 1111*a*-1111*d* include a request context field 1114*a*-1114*d* including request context data representative of a context of the resource request (Context Tag). In yet further addition, each of the resource requests 1111*a*-1111*d* include a request characteristic field 1115*a*-1115*d* including request characteristic data representative of a characteristic of the resource request (Characteristic Tag). The request characteristic field 1115*a*-1115*d* is shown and described separately for ease of discussion, but it is to be understood that the request characteristic may be derived from the resource type information or from the resource group information or from any other information forming the resource request.

In accordance with an example, the compute control plane can fetch, from the limit service data plane 740 (FIG. 7) (alternatively, the fetch operation can be performed at a resource control plane 1130) all tag-based limits/quotas 1150 associated with the tag that is part of the request from user 701. Such tag-based quotas can apply across, for example, an entire tenancy and does not have to be compartment specific.

In accordance with an embodiment, the compute control plane can check to see if the requested usage would violate any of the tag-based limits/quotas for any quota or limit rules in the memory 1150. If the requested usage does not violate any resource tag-based quota, then the request can be processed to, for example, the database. If the requested usage would violate any of the resource tag-based limits/quotas along the compartment tree, then the request can be dropped and a message can be sent to notify the user.

In accordance with the example embodiment, resource tag-based limits/quotas are applied to compartments within the tenancy. In accordance with an example embodiment to be described below, the resource tag-based limits/quotas are applied across, for example, an entire tenancy, including all regions in which the tenancy is enabled, essentially spanning multiple compartments. When determining whether the requested instance would violate any resource tag-based limits/quotas, the compute control plane can ensure that the new request, for example via a service developers kit (SDK), doesn't violate any of the quotas. If the request would exceed a quota, compute control plane can fail the request.

In accordance with an embodiment, the SDK of the compute control plane can be present in every control plane of the cloud infrastructure environment. In accordance with an embodiment, the compute control plane can work in conjunction with the limit service data plane to check a new request against a resource tag-based limit/quota.

In accordance with an embodiment, when a client triggers an operation to create a cloud resource, the request goes to the resource control plane. The resource control plane asks from a limits service to know if the resource can be safely spun up considering the limits that are configured at a selected level such as for example at a group level. If the limits server returns a negative/failure response to the resource control plane, then the resource is not created, and the request is dropped.

Internally when limits service receives the request, it checks the tag that is associated with the resource creation, and looks up into a store or a database or in the memory to see the current usage of the resource with that specific tag. The resources may be associated with more than one tag, and the resources may be associated with a plurality of different tags. If the tag value exceeds the limits that are configured at the selected level such as at the group level for example, it sends a failure/negative response to the resource control plane so that resource creation fails.

In accordance with an embodiment, a memory device 1140 stores tag-based quota data 1150 representative of a plurality of tag-based quotas of resource provisioning in the tenancy 305 (FIG. 3). A request 1111*a*-1111*d* to provision a resource in the tenancy is received. The request 1111*a*-1111*d* may include request characteristic data 1115*a*-1115*d* representative of a request characteristic of the request. In accordance with an embodiment, a usage of resources in the tenancy associated with a resource tag 150*a*, 160*a*, 170*a* (FIG. 1) corresponding to the request characteristic of the request is determined and compared against the plurality of tag-based quotas and/or limits 1150. The request to provision the resource is dropped based on the determined usage exceeding one of the plurality of tag-based quotas.

In accordance with an example of the embodiment, the tenancy 305 comprises a plurality of compartments 1142, 1144, 1146 storing the resources, wherein each compartment of the plurality of compartments provides isolation of a set of the resources within the compartment relative to one or more other sets of the resources in the other compartments. The usage of the resources in the tenancy associated with the resource tag corresponding to the request characteristic of the request is determined collectively across the plurality of compartments, and the usage determined collectively across the plurality of compartments is compared against the plurality of tag-based quotas of the tenancy. The request 1111a-1111d to provision the resource is dropped based on the usage determined collectively across the plurality of compartments exceeding one of the plurality of tag-based quotas.

In accordance with an example of the embodiment, the tag-based quota data 1150 stored in the memory device 1140 is representative of a plurality of tag-based quotas of resource provisioning in the tenancy of a corresponding plurality of resource types of the tenancy. In addition, the request characteristic data 1115a-1115d of the request 1111a-1111d to provision the resource in the tenancy comprises resource type data representative of a first resource type 1112a-1112d of the requested resource. In the example embodiment, a usage of resources in the tenancy associated with a resource tag corresponding to the first resource type 1112a is determined and compared against a first tag-based quota 1120a of resource provisioning in the tenancy of the first resource type. The request 1111a to provision the resource of the first resource type 1112a is dropped based on the determined usage of resources in the tenancy associated with the resource tag corresponding to the first resource type exceeding the first tag-based quota stored for example as a policy 1120a of the resource provisioning in the tenancy of the first resource type.

In accordance with an example of the embodiment, the tag-based quota data 1150 stored in the memory device 1140 is representative of a plurality of tag-based quotas of resource provisioning in the tenancy allocated to a corresponding plurality of user groups of the tenancy. The request characteristic data 1115a-1115d of the request 1111a-1111d to provision the resource in the tenancy comprises user group data 1113a-1113d representative of a user group category assigned to a user of the system requesting the resource. A usage of resources in the tenancy associated with a resource tag corresponding to the user group category is determined and compared against a first tag-based quota 1120b of resource provisioning in the tenancy allocated the user group category. The request to provision the resource is dropped based on the determined usage of resources in the tenancy associated with the resource tag corresponding to the user group category exceeding the first tag-based quota of resource provisioning in the tenancy allocated to the user group category.

In accordance with an example of the embodiment, the tag-based quota data stored in the memory device is representative of a tag-based quota of resource provisioning in the tenancy of a plurality of resource types of the tenancy allocated to a plurality of user groups of the tenancy. The request characteristic data of the request to provision the resource in the tenancy may include, for example, i) resource type data representative of a first resource type of the requested resource; and/or ii) user group data representative of a user group category assigned to a user of the system requesting the resource. In the example, a usage of resources in the tenancy associated with a resource tag corresponding to the first resource type provisioned to the first user group category is determined and compared against a first tag-based quota of resource provisioning in the tenancy of the first resource type allocated to the first user group category. In addition, the request to provision the resource is dropped based on the determined usage of resources in the tenancy associated with the resource tag corresponding to the first resource type provisioned to the first user group category exceeding the first tag-based quota of the resource provisioning in the tenancy of the first resource type allocated to the first user group category.

In accordance with an example of the embodiment, the tag-based quota data 1150 stored in the memory device 1140 is representative of a tag-based quota of resource provisioning in the tenancy of a plurality of resource types of the tenancy allocated to a plurality of user groups of the tenancy. A first request to track resource usage of the tenancy may be received from the user 701, wherein the first request includes request characteristic data 1115a-1115d representative of a first user group category 1113a-1113d and a first resource type 1112a-1112d.

A first usage of resources in the tenancy associated with a resource tag corresponding to the first resource type provisioned by the first user group category is determined, and resource usage tracking data is generated based on the determined first usage of the resources in the tenancy of the first resource type provisioned by the first user group.

In accordance with an example of the embodiment, the request to provision the resource is dropped based on the determined usage exceeding one of the plurality of tag-based quotas. However, an override request to provision the resource of the tenancy may be received from the user 701. The resource is selectively provisioned in accordance with an example of the embodiment based on the system receiving the override request. In addition, resource usage overage data is generated based on the resource being selectively provisioned in response to the system receiving the override request.

Figure 12:
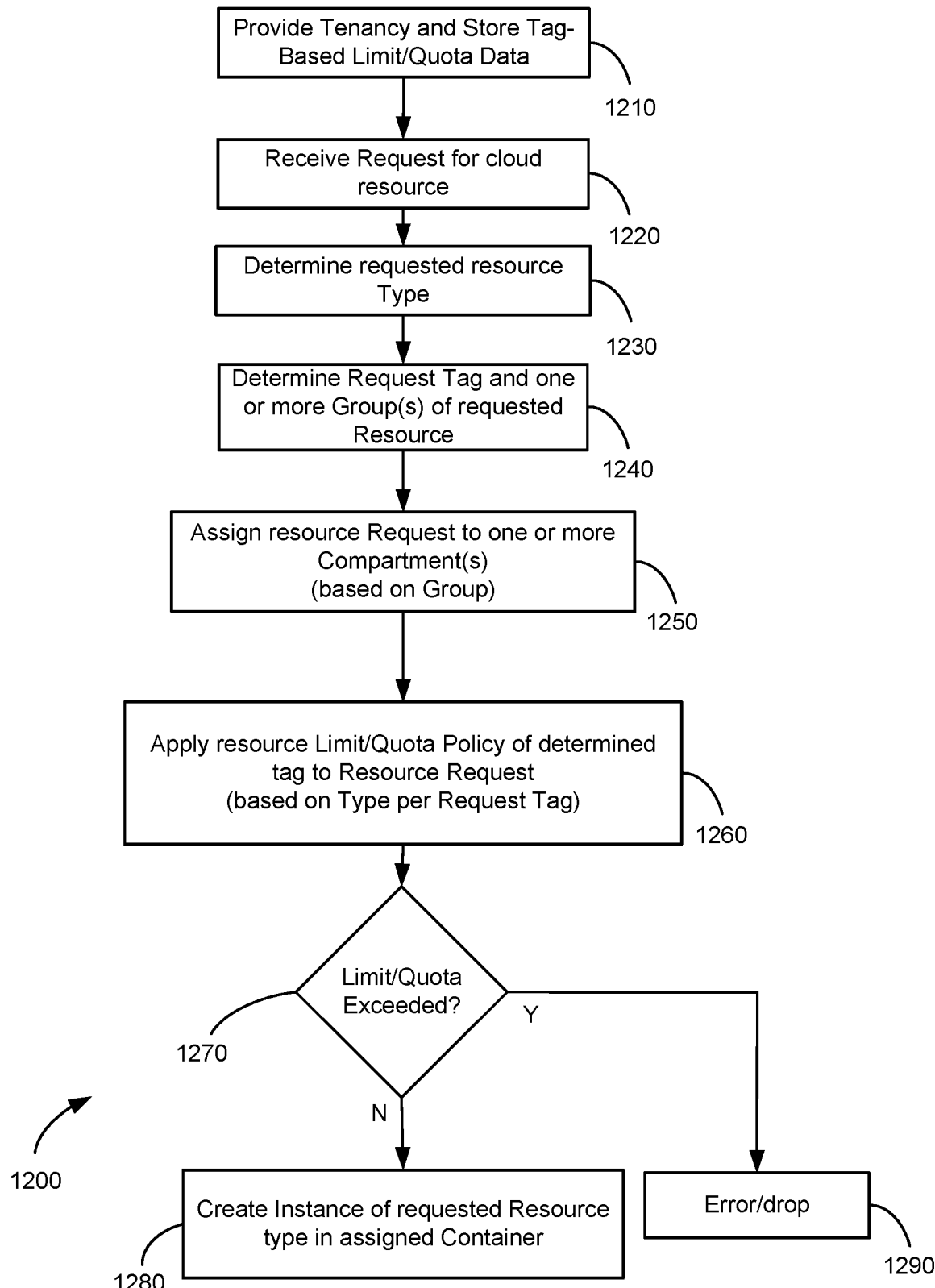
FIG. 12 is a flow diagram showing a method for limiting or imposing quotas on provisioning resources in a cloud infrastructure environment based on resource tags in accordance with an example embodiment.

FIG. 12 is a flow diagram showing a method 1200 for limiting or imposing quotas on provisioning resources in a cloud infrastructure environment based on resource tags in accordance with an example embodiment.

In accordance with the method 1200, a tenancy is provided and tag-based limit/quota data is stored in a memory in step 1210. In its preferred form, the tenancy is provided in an associated cloud infrastructure environment by a computer including one or more processors and a memory device operatively coupled with the computer. The memory device stores tag based control logic that is executable by the computer to provide a tag-based control of resource usage in an associated cloud infrastructure environment. In the example embodiment, the tag-based quota data stored in the memory device is representative of a plurality of tag-based quotas of resource provisioning in the tenancy.

A request is received at step 1220 to provision a resource in the tenancy. The request comprises request characteristic data representative of a request characteristic of the request.

In step 1230, a resource type of the requested resource is determined.

In step 1240 a usage of resources in the tenancy associated with a resource tag corresponding to the request characteristic of the request are determined by the one or more processors executing the tag based control logic.

The request is assigned in step 1250 to one or more of the compartments based on a group of the resource requested.

The one or more processors executing the tag based control logic determine a usage of the resources associated with the tag and the determined usage is compared, at step 1260, against the plurality of tag-based quotas.

The resource request is dropped in step 1290 by the one or more processors executing the tag based control logic the request to provision the resource based on the a determination, at step 1270, that the usage exceeding one of the plurality of tag-based quotas.

The instance of the requested resource is created in step 1280 by the one or more processors executing the tag based control logic the request to provision the resource based on a determination, at step 1270, that the usage does not exceed the one of the plurality of tag-based quotas.

In accordance with an example of the embodiments, the tenancy is provided by providing a plurality of compartments storing the resources, wherein each compartment of the plurality of compartments provides isolation of a set of the resources within the compartment relative to one or more other sets of the resources in the other compartments. In addition, determining the usage includes determining a usage of the resources in the tenancy associated with the resource tag corresponding to the request characteristic of the request collectively across the plurality of compartments, and the comparing comprises comparing the usage determined collectively across the plurality of compartments against the plurality of tag-based quotas of the tenancy. In further addition, the dropping the request comprises dropping the request to provision the resource based on the usage determined collectively across the plurality of compartments exceeding one of the plurality of tag-based quotas.

In accordance with an example of the embodiments, the storing the tag-based quota data comprises storing tag-based quota data in the memory device representative of a plurality of tag-based quotas of resource provisioning in the tenancy of a corresponding plurality of resource types of the tenancy. In addition, the receiving the request comprises receiving a request comprising resource type data representative of a first resource type of the requested resource, and the determining comprises determining a usage of resources in the tenancy associated with a resource tag corresponding to the first resource type is determined. In further addition, the comparing comprises comparing the determined usage against a first tag-based quota of resource provisioning in the tenancy of the first resource type, and the dropping the request comprises dropping the request based on the determined usage of resources in the tenancy associated with the resource tag corresponding to the first resource type exceeding the first tag-based quota of the resource provisioning in the tenancy of the first resource type.

In accordance with an example of the embodiments, the storing the tag-based quota data comprises storing tag-based quota data in the memory device representative of a plurality of tag-based quotas of resource provisioning in the tenancy allocated to a corresponding plurality of user groups of the tenancy, and the receiving the request comprises receiving a request comprising resource type data representative of a user group category assigned to a user of the system requesting the resource. In addition, the determining comprises determining a usage of resources in the tenancy associated with a resource tag corresponding to the user group category, and the comparing comprises comparing the determined usage against a first tag-based quota of resource provisioning in the tenancy allocated the user group category. In further addition, the dropping the request comprises dropping the request based on the determined usage of resources in the tenancy associated with the resource tag corresponding to the user group category exceeding the first tag-based quota of resource provisioning in the tenancy allocated to the user group category.

In accordance with an example of the embodiments, the storing the tag-based quota data comprises storing tag-based quota data in the memory device representative of a tag-based quota of resource provisioning in the tenancy of a plurality of resource types of the tenancy allocated to a plurality of user groups of the tenancy, and the receiving the request comprises receiving a request comprising resource type data comprising: i) resource type data representative of a first resource type of the requested resource; and ii) user group data representative of a user group category assigned to a user of the system requesting the resource. In addition, the determining comprises determining a usage of resources in the tenancy associated with a resource tag corresponding to the first resource type provisioned to the first user group category, and the comparing comprises comparing the determined usage against a first tag-based quota of resource provisioning in the tenancy of the first resource type allocated to the first user group category. In further addition, the dropping the request comprises dropping the request based on the determined usage of resources in the tenancy associated with the resource tag corresponding to the first resource type provisioned to the first user group category exceeding the first tag-based quota of the resource provisioning in the tenancy of the first resource type allocated to the first user group category.

In accordance with an example of the embodiments, the storing tag-based quota data in the memory device representative of a tag-based quota of resource provisioning in the tenancy of a plurality of resource types of the tenancy allocated to a plurality of user groups of the tenancy. The method further includes receiving a first request to track resource usage of the tenancy, wherein the first request comprises request characteristic data representative of a first user group category and a first resource type. In addition, the determining a first usage of resources in the tenancy associated with a resource tag corresponding to the first resource type provisioned by the first user group category, and generating resource usage tracking data based on the determined first usage of the resources in the tenancy of the first resource type provisioned by the first user group.

The method further includes receiving an override request to provision the resource of the tenancy, selectively provisioning the resource based on the system receiving the override request, and generating resource usage overage data based on the resource being selectively provisioned in response to the system receiving the override request.

In accordance with various embodiments, the teachings herein may be conveniently implemented using one or more conventional general purpose or specialized computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the teachings herein can include a computer program product which is a non-transitory computer readable storage medium (media) having instructions stored thereon/in which can be used to program a computer to perform any of the processes of the present teachings. Examples of such storage mediums can include, but are not limited to, hard disk drives, hard disks, hard drives, fixed disks, or other electromechanical data storage devices, floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems, or other types of storage media or devices suitable for non-transitory storage of instructions and/or data.

The foregoing description has been provided for the purposes of illustration and description. It is not intended to be exhaustive or to limit the scope of protection to the precise forms disclosed. Many modifications and variations will be apparent to the practitioner skilled in the art. For example, although several of the examples provided herein illustrate use with enterprise software applications components such as Oracle Fusion Applications; cloud environments such as Oracle Cloud Infrastructure; and cloud services such as Oracle Fusion Analytics; in accordance with various embodiments, the systems and methods described herein can be used with other types of enterprise software applications, cloud environments, cloud services, cloud computing, or other computing environments.

The embodiments were chosen and described in order to best explain the principles of the present teachings and their practical application, thereby enabling others skilled in the art to understand the various embodiments and with various modifications that are suited to the particular use contemplated. It is intended that the scope be defined by the following claims and their equivalents.

What is claimed is:

1. A system for tag based control of resource usage in an associated cloud infrastructure environment, the system comprising:
   a computer comprising one or more microprocessors;
   a tenancy defined in the associated cloud infrastructure environment; and
   a memory device operatively coupled with the computer, the memory device storing logic executable by the computer for providing the tag based control of resource usage in the tenancy, the memory storing tag-based quota data representative of a plurality of usage quotas of resource provisioning to users of the tenancy,
   wherein resources in the tenancy are provided in a plurality of compartments, wherein each compartment provides isolation of a set of resources within the compartment relative to one or more other isolated sets of resources in other compartments,
   wherein a request to provision a first resource in the tenancy is received from a user of the tenancy, the request comprising request characteristic data representative of a resource type of the requested first resource and a user group category assigned to the user requesting the first resource,
   wherein usages of the sets of resources in the tenancy spanning the plurality of compartments and associated with a resource tag corresponding to the resource type of the characteristic data of the request are determined,
   wherein the determined usages of the isolated sets of resources are collectively compared against a group usage quota of the plurality of usage quotas assigned to the user requesting the first resource,
   wherein the request received from the user of the tenancy to provision the first resource is dropped based on the determined usages of the isolated sets of resources exceeding of the group usage quota.

2. The system according to claim 1, wherein:
   the usage of the resources in the tenancy associated with the resource tag corresponding to the request characteristic of the request is determined collectively across the plurality of compartments, and the usage determined collectively across the plurality of compartments is compared against the plurality of usage quotas of the tenancy; and
   the request to provision the first resource is dropped based on the usage determined collectively across the plurality of compartments exceeding one of the plurality of usage quotas.

3. The system according to claim 1, wherein:
   the tag-based quota data stored in the memory device is representative of a plurality of usage quotas of resource provisioning in the tenancy of a corresponding plurality of resource types of the tenancy;
   the request characteristic data of the request to provision the first resource in the tenancy comprises resource type data representative of a first resource type of the requested resource;
   a usage of resources in the tenancy associated with a resource tag corresponding to the first resource type is determined and compared against a first tag-based quota of resource provisioning in the tenancy of the first resource type; and
   the request to provision the first resource of the first resource type is dropped based on the determined usage of resources in the tenancy associated with the resource tag corresponding to the first resource type exceeding the first tag-based quota of the resource provisioning in the tenancy of the first resource type.

4. The system according to claim 1, wherein:
   the tag-based quota data stored in the memory device is representative of a plurality of usage quotas of resource provisioning in the tenancy allocated to a corresponding plurality of user groups of the tenancy;
   the request characteristic data of the request to provision the first resource in the tenancy comprises user group data representative of a user group category assigned to a user of the system requesting the first resource;
   a usage of resources in the tenancy associated with a resource tag corresponding to the user group category is determined and compared against a first tag-based quota of resource provisioning in the tenancy allocated the user group category; and
   the request to provision the first resource is dropped based on the determined usage of resources in the tenancy associated with the resource tag corresponding to the user group category exceeding the first tag-based quota of resource provisioning in the tenancy allocated to the user group category.

5. The system according to claim 1, wherein:
   the tag-based quota data stored in the memory device is representative of a tag-based quota of resource provisioning in the tenancy of a plurality of resource types of the tenancy allocated to a plurality of user groups of the tenancy;
   the request characteristic data of the request to provision the first resource in the tenancy comprises:
   i) resource type data representative of a first resource type of the requested resource; and
   ii) user group data representative of a user group category assigned to a user of the system requesting the first resource;
   a usage of resources in the tenancy associated with a resource tag corresponding to the first resource type provisioned to the first user group category is determined and compared against a first tag-based quota of resource provisioning in the tenancy of the first resource type allocated to the first user group category; and
   the request to provision the first resource is dropped based on the determined usage of resources in the tenancy associated with the resource tag corresponding to the first resource type provisioned to the first user group category exceeding the first tag-based quota of the resource provisioning in the tenancy of the first resource type allocated to the first user group category.

6. The system according to claim 1, wherein:
the tag-based quota data stored in the memory device is representative of a tag-based quota of resource provisioning in the tenancy of a plurality of resource types of the tenancy allocated to a plurality of user groups of the tenancy;
a first request to track resource usage of the tenancy is received, the first request comprising request characteristic data representative of a first user group category and a first resource type;
a first usage of resources in the tenancy associated with a resource tag corresponding to the first resource type provisioned by the first user group category is determined; and
resource usage tracking data is generated based on the determined first usage of the resources in the tenancy of the first resource type provisioned by the first user group.

7. The system according to claim 1, wherein:
the request to provision the first resource is dropped based on the determined usage exceeding one of the plurality of usage quotas;
an override request to provision the first resource of the tenancy is received;
the first resource is selectively provisioned based on the system receiving the override request; and resource usage overage data is generated based on the first resource being selectively provisioned in response to the system receiving the override request.

8. A method for tag based control of resource usage in an associated cloud infrastructure environment, the method comprising:
providing a tenancy in the associated cloud infrastructure environment by a computer comprising one or more processors and a memory device operatively coupled with the computer, the memory device storing tag based control logic;
storing tag-based quota data in the memory device, the tag-based quota data being representative of a plurality of usage quotas of resource provisioning to users of the tenancy;
providing resources of the tenancy in a plurality of compartments, wherein each compartment provides isolation of a set of the resources within the compartment relative to one or more other isolated sets of the resources in other compartments;
receiving a request from a user of the tenancy to provision a first resource in the tenancy, the request comprising request characteristic data representative of a resource type of the requested first resource and a user group category assigned to the user requesting the first resource;
determining by the one or more processors executing the tag based control logic usages of the sets of resources in the tenancy spanning the plurality of compartments and associated with a resource tag corresponding to the resource type characteristic data of the request;
comparing by the one or more processors executing the tag based control logic the determined sets of usages of the isolated sets of resources collectively against a group usage quota of the plurality of usage quotas assigned to the user requesting the first resource; and
dropping by the one or more processors executing the tag based control logic the request received from the user of the tenancy to provision the first resource based on the determined usages of the isolated sets of resources exceeding of the group usage quota.

9. The method according to claim 8, wherein:
the determining the usage comprises determining a usage of the resources in the tenancy associated with the resource tag corresponding to the request characteristic of the request collectively across the plurality of compartments;
the comparing comprises comparing the usage determined collectively across the plurality of compartments against the plurality of usage quotas of the tenancy; and
the dropping comprises dropping the request to provision the first resource based on the usage determined collectively across the plurality of compartments exceeding one of the plurality of usage quotas.

10. The method according to claim 8, wherein:
the storing the tag-based quota data comprises storing tag-based quota data in the memory device representative of a plurality of usage quotas of resource provisioning in the tenancy of a corresponding plurality of resource types of the tenancy;
the receiving the request comprises receiving a request comprising resource type data representative of a first resource type of the requested first resource;
the determining comprises determining a usage of resources in the tenancy associated with a resource tag corresponding to the first resource type is determined;
the comparing comprises comparing the determined usage against a first tag-based quota of resource provisioning in the tenancy of the first resource type; and
the dropping the request comprises dropping the request based on the determined usage of resources in the tenancy associated with the resource tag corresponding to the first resource type exceeding the first tag-based quota of the resource provisioning in the tenancy of the first resource type.

11. The method according to claim 8, wherein:
the storing the tag-based quota data comprises storing tag-based quota data in the memory device representative of a plurality of usage quotas of resource provisioning in the tenancy allocated to a corresponding plurality of user groups of the tenancy;
the receiving the request comprises receiving a request comprising resource type data representative of a user group category assigned to a user of the system requesting the first resource;
the determining comprises determining a usage of resources in the tenancy associated with a resource tag corresponding to the user group category;
the comparing comprises comparing the determined usage against a first tag-based quota of resource provisioning in the tenancy allocated the user group category; and
the dropping the request comprises dropping the request based on the determined usage of resources in the tenancy associated with the resource tag corresponding to the user group category exceeding the first tag-based quota of resource provisioning in the tenancy allocated to the user group category.

12. The method according to claim 8, wherein:
the storing the tag-based quota data comprises storing tag-based quota data in the memory device representative of a tag-based quota of resource provisioning in the tenancy of a plurality of resource types of the tenancy allocated to a plurality of user groups of the tenancy;
the receiving the request comprises receiving a request comprising resource type data comprising:

i) resource type data representative of a first resource type of the requested first resource; and ii) user group data representative of a user group category assigned to a user of the system requesting the first resource;

the determining comprises determining a usage of resources in the tenancy associated with a resource tag corresponding to the first resource type provisioned to the first user group category;

the comparing comprises comparing the determined usage against a first tag-based quota of resource provisioning in the tenancy of the first resource type allocated to the first user group category; and the dropping the request comprises dropping the request based on the determined usage of resources in the tenancy associated with the resource tag corresponding to the first resource type provisioned to the first user group category exceeding the first tag-based quota of the resource provisioning in the tenancy of the first resource type allocated to the first user group category.

13. The method according to claim 8, further comprising:

storing tag-based quota data in the memory device representative of a tag-based quota of resource provisioning in the tenancy of a plurality of resource types of the tenancy allocated to a plurality of user groups of the tenancy;

receiving a first request to track resource usage of the tenancy is received, the first request comprising request characteristic data representative of a first user group category and a first resource type;

determining a first usage of resources in the tenancy associated with a resource tag corresponding to the first resource type provisioned by the first user group category; and generating resource usage tracking data based on the determined first usage of the resources in the tenancy of the first resource type provisioned by the first user group.

14. The method according to claim 8, further comprising:

receiving an override request to provision the first resource of the tenancy;

selectively provisioning the first resource based on the system receiving the override request; and generating resource usage overage data based on the first resource being selectively provisioned in response to the system receiving the override request.

15. A non-transitory computer readable storage medium having instructions thereon for tag based control of resource usage in an associated cloud infrastructure environment, that when read and executed by a computer cause the computer to perform steps comprising:

providing a tenancy in the associated cloud infrastructure environment by a computer comprising one or more processors and a memory device operatively coupled with the computer, the memory device storing tag based control logic;

storing tag-based quota data in the memory device, the tag-based quota data being representative of a plurality of usage quotas of resource provisioning to users of the tenancy;

providing resources of the tenancy in a plurality of compartments, wherein each compartment provides isolation of a set of the resources within the compartment relative to one or more other isolated sets of the resources in other compartments;

receiving a request from a user of the tenancy to provision a first resource in the tenancy, the request comprising request characteristic data representative of a resource type of the requested first resource and a user group category assigned to the user requesting the first resource;

determining by the one or more processors executing the tag based control logic usages of the sets of resources in the tenancy spanning the plurality of compartments and associated with a resource tag corresponding to the resource type characteristic data of the request;

comparing by the one or more processors executing the tag based control logic the determined sets of usages of the isolated sets of resources collectively against a group usage quota of the plurality of usage quotas assigned to the user requesting the first resource; and dropping by the one or more processors executing the tag based control logic the request received from the user of the tenancy to provision the first resource based on the determined usages of the isolated sets of resources exceeding of the group usage quota.

16. The storage medium according to claim 15, wherein:

the determining the usage comprises determining a usage of the resources in the tenancy associated with the resource tag corresponding to the request characteristic of the request collectively across the plurality of compartments;

the comparing comprises comparing the usage determined collectively across the plurality of compartments against the plurality of usage quotas of the tenancy; and the dropping comprises dropping the request to provision the first resource based on the usage determined collectively across the plurality of compartments exceeding one of the plurality of usage quotas.

17. The storage medium according to claim 15, wherein:

the storing the tag-based quota data comprises storing tag-based quota data in the memory device representative of a plurality of usage quotas of resource provisioning in the tenancy of a corresponding plurality of resource types of the tenancy;

the receiving the request comprises receiving a request comprising resource type data representative of a first resource type of the requested first resource;

the determining comprises determining a usage of resources in the tenancy associated with a resource tag corresponding to the first resource type is determined;

the comparing comprises comparing the determined usage against a first tag-based quota of resource provisioning in the tenancy of the first resource type; and the dropping the request comprises dropping the request based on the determined usage of resources in the tenancy associated with the resource tag corresponding to the first resource type exceeding the first tag-based quota of the resource provisioning in the tenancy of the first resource type.

18. The storage medium according to claim 15, wherein:

the storing the tag-based quota data comprises storing tag-based quota data in the memory device representative of a plurality of usage quotas of resource provisioning in the tenancy allocated to a corresponding plurality of user groups of the tenancy;

the receiving the request comprises receiving a request comprising resource type data representative of a user group category assigned to a user of the system requesting the first resource;

the determining comprises determining a usage of resources in the tenancy associated with a resource tag corresponding to the user group category;

the comparing comprises comparing the determined usage against a first tag-based quota of resource provisioning in the tenancy allocated the user group category; and the dropping the request comprises dropping the request based on the determined usage of resources in the tenancy associated with the resource tag corresponding to the user group category exceeding the first tag-based quota of resource provisioning in the tenancy allocated to the user group category.

19. The storage medium according to claim 15, wherein:

the storing the tag-based quota data comprises storing tag-based quota data in the memory device representative of a tag-based quota of resource provisioning in the tenancy of a plurality of resource types of the tenancy allocated to a plurality of user groups of the tenancy;

the receiving the request comprises receiving a request comprising resource type data comprising:
  i) resource type data representative of a first resource type of the requested first resource; and
  ii) user group data representative of a user group category assigned to a user of the system requesting the first resource;

the determining comprises determining a usage of resources in the tenancy associated with a resource tag corresponding to the first resource type provisioned to the first user group category;

the comparing comprises comparing the determined usage against a first tag-based quota of resource provisioning in the tenancy of the first resource type allocated to the first user group category; and the dropping the request comprises dropping the request based on the determined usage of resources in the tenancy associated with the resource tag corresponding to the first resource type provisioned to the first user group category exceeding the first tag-based quota of the resource provisioning in the tenancy of the first resource type allocated to the first user group category.

20. The storage medium according to claim 15, further comprising:

storing tag-based quota data in the memory device representative of a tag-based quota of resource provisioning in the tenancy of a plurality of resource types of the tenancy allocated to a plurality of user groups of the tenancy;

receiving a first request to track resource usage of the tenancy is received, the first request comprising request characteristic data representative of a first user group category and a first resource type;

determining a first usage of resources in the tenancy associated with a resource tag corresponding to the first resource type provisioned by the first user group category; and generating resource usage tracking data based on the determined first usage of the resources in the tenancy of the first resource type provisioned by the first user group.

\* \* \* \* \*